(12) United States Patent
Shenfield

(10) Patent No.: US 7,814,404 B2
(45) Date of Patent: Oct. 12, 2010

(54) SYSTEM AND METHOD FOR APPLYING WORKFLOW OF GENERIC SERVICES TO COMPONENT BASED APPLICATIONS FOR DEVICES

(75) Inventor: Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 964 days.

(21) Appl. No.: 11/069,970

(22) Filed: Mar. 3, 2005

(65) Prior Publication Data

US 2006/0200748 A1 Sep. 7, 2006

(51) Int. Cl.
G06F 17/00 (2006.01)
(52) U.S. Cl. ...................................... 715/200
(58) Field of Classification Search ................. 715/200, 715/234
See application file for complete search history.

(56) References Cited

U.S. PATENT DOCUMENTS

| | | | |
|---|---|---|---|
| 5,999,911 A * | 12/1999 | Berg et al. | 705/9 |
| 6,192,415 B1 | 2/2001 | Haverstock et al. | |
| 6,523,027 B1 * | 2/2003 | Underwood | 1/1 |
| 6,609,108 B1 * | 8/2003 | Pulliam et al. | 705/27 |
| 6,980,963 B1 * | 12/2005 | Hanzek | 705/26 |
| 6,993,743 B2 * | 1/2006 | Crupi et al. | 717/102 |
| 7,130,885 B2 * | 10/2006 | Chandra et al. | 709/206 |
| 7,203,948 B2 * | 4/2007 | Mukundan et al. | 719/330 |
| 7,350,209 B2 * | 3/2008 | Shum | 718/104 |
| 7,593,992 B2 * | 9/2009 | Wodtke et al. | 709/206 |
| 7,617,013 B2 * | 11/2009 | Kolenc et al. | 700/97 |
| 2002/0112078 A1 | 8/2002 | Yach | |
| 2002/0156812 A1 * | 10/2002 | Krasnoiarrov et al. | 707/513 |
| 2002/0178290 A1 | 11/2002 | Coulthard et al. | |
| 2002/0188761 A1 * | 12/2002 | Chikirivao et al. | 709/250 |

(Continued)

FOREIGN PATENT DOCUMENTS

WO      WO 01/75546 A2      10/2001

(Continued)

OTHER PUBLICATIONS

Brambilla et al., Declarative Specification of Web Applications Exploiting Web Services and Workflows, ACM 2004, pp. 1-2.*

(Continued)

*Primary Examiner*—Cong-Lac Huynh
(74) *Attorney, Agent, or Firm*—Gowling Lafleur Henderson LLP

(57) ABSTRACT

A system and method for representing a workflow for a plurality of components (data, message and presentation components) of a component-based application configured from a page-based application for messaging over a network between a device and a schema-defined service of a data source. The respective data, message and presentation components, selected from a series of presentation pages of the page-based application, have data, message and presentation descriptors in a structured data language representing respective elements embedded in the presentation pages. At least two of the components are operatively coupled to one another. Dependency links associated with events corresponding to the embedded elements are selected to describe the workflow of the components for operation when executed on the device. A set of instructions based on the dependency links are generated for a workflow component of the component based application to coordinate the operation of the other components.

41 Claims, 10 Drawing Sheets

U.S. PATENT DOCUMENTS

| | | | |
|---|---|---|---|
| 2003/0097345 A1* | 5/2003 | Upton | 705/401 |
| 2004/0015537 A1 | 1/2004 | Doerksen et al. | |
| 2004/0074961 A1* | 4/2004 | Hull et al. | 235/376 |
| 2004/0078105 A1* | 4/2004 | Moon et al. | 700/100 |
| 2004/0128163 A1* | 7/2004 | Goodman et al. | 705/2 |
| 2004/0187140 A1 | 9/2004 | Aigner et al. | |
| 2004/0215700 A1* | 10/2004 | Shenfield et al. | 709/201 |
| 2004/0220998 A1 | 11/2004 | Shenfield et al. | |
| 2005/0057560 A1* | 3/2005 | Bibr et al. | 345/418 |
| 2005/0138160 A1* | 6/2005 | Klein et al. | 709/223 |
| 2005/0144555 A1* | 6/2005 | Morris | 715/513 |
| 2005/0197970 A1* | 9/2005 | Chehade et al. | 705/80 |
| 2005/0198100 A1* | 9/2005 | Goring et al. | 709/200 |
| 2005/0204334 A1* | 9/2005 | Parthasarathy et al. | 717/107 |
| 2005/0209841 A1* | 9/2005 | Arning et al. | 703/22 |
| 2006/0015370 A1* | 1/2006 | Shen | 705/2 |
| 2006/0031746 A1* | 2/2006 | Toepfer et al. | 715/500 |
| 2006/0047665 A1* | 3/2006 | Neil | 707/10 |
| 2006/0149726 A1* | 7/2006 | Ziegert et al. | 707/5 |
| 2006/0200766 A1* | 9/2006 | Lakritz | 715/536 |
| 2006/0236304 A1* | 10/2006 | Luo et al. | 717/105 |
| 2006/0236307 A1* | 10/2006 | Debruin et al. | 717/117 |
| 2006/0248406 A1* | 11/2006 | Qing et al. | 714/38 |
| 2006/0248506 A1* | 11/2006 | Luo et al. | 717/104 |
| 2006/0282445 A1* | 12/2006 | Chen et al. | 707/100 |
| 2007/0016915 A1* | 1/2007 | Mukundan et al. | 719/330 |
| 2007/0083810 A1* | 4/2007 | Scott et al. | 715/525 |
| 2007/0130152 A1* | 6/2007 | Kosov et al. | 707/10 |
| 2007/0276714 A1* | 11/2007 | Beringer | 705/7 |
| 2007/0288258 A1* | 12/2007 | Beringer et al. | 705/1 |
| 2008/0052124 A1* | 2/2008 | Goodman et al. | 705/3 |
| 2008/0104108 A1* | 5/2008 | Leung | 707/102 |

FOREIGN PATENT DOCUMENTS

| | | | |
|---|---|---|---|
| WO | WO02/44897 A1 | 6/2002 | |
| WO | WO 2004/029801 A1 | 4/2004 | |
| WO | 0175549 A2 | 7/2004 | |
| WO | WO2004/059938 A2 | 7/2004 | |
| WO | WO2004/059939 A2 | 7/2004 | |
| WO | WO2004/059957 A2 | 7/2004 | |

OTHER PUBLICATIONS

Shegalov et al., XML-enabled Workflow Management of E-services across Heterogeneous Platforms, Google search, the VLDB Journal 2001, pp. 91-103.*
Levi et al., A Goal-driven Approach to Enterprise Component Identification and Specification, ACM Oct. 2002, pp. 45-52.*
Hassell et al., Modeling the Workflow of Prescription Writing, ACM 2003, pp. 235-239.*
Rifon et al., A Component Model for Standardized Web-Based Education, ACM Aug. 2001, pp. 1-21.*
Brambilla et al., Model-driven Design of Service-enable Web Applications, ACM 2005, pp. 851-856.*
Mayer et al., ICENI Dataflow and Workflow: Composition and Scheduling in Space and Time, Google 2003, pp. 1-8.*
Werner et al., OdysseyShare: an Environement for Collaborative Component-Based Development, IEEE 2003, pp. 1-8.*
Mecella et al., A Repository of Workflow Components for Cooperative e-Applications, Google 2001, pp. 1-20.*
European Search Report for EP Application No. 05101667.3; Oct. 27, 2005; 12 pages; European Patent Office.
John Beatty, BEA Systems, Stephen Brodsky, IBM Corp., Martin Nally, IBM Corp., Rahul Patel, BEA Systems; Next-Generation Data Programming: Service Data Objects, A Joint Whitepaper with IBM and BEA; Nov. 2003; 15 pages.
The Java Community Process (SM) Program—JSRs: Java Specification Requests, JSR 235: Service Data Objects; printed Feb. 25, 2005; from: http://web1.jcp.org/en/jsr/detail?id=235; XP-002335693; 9 pages.
The Java Community Process (SM) Program—JSRs: Java Specification Requests; A Standard Data Binding & Data Access Facility for J2EE (TM); XP-002334216; 7 pages.
Oracle Toplink 10g—Feature Overview; Jan. 2006; http://www.oracle.com/technology/products/ias/toplink/technical/tl10g_fov.htm; 2 pages.
Introduction to Toplink Object-XML Mapping; Sep. 5, 2006; http://www.oracle.com/technology/tech/java/newsletter/articles/toplink/toplinkox.htm; 3 pages.
WfmOpen—Welcome to the WfMOpen project; http://wfmopen.sourceforge.net/; Oct. 5, 2006; 4 pages.
United Kingdom combined Search and Examination Report for UK Application No. GB0604281.6; May 11, 2006; 5 pages; The Patent Office.
United Kingdom Examination Report for UK Application No. GB0604288.1 dated Oct. 19, 2009, The Patent Office.
United Kingdom Examination Report for UK Application No. GB0604281.6 dated Oct. 19, 2009, The Patent Office.
Extended European search Report issued by the European Patent Office dated Mar. 8, 2009 for corresponding European Patent Application No. 09162130.0.
United Kingdom Examination Report for UK Application No. GB0604288.1 dated Aug. 24, 2009, The Patent Office.
United Kingdom Examination Report for UK Application No. GB0604281.6 dated Aug. 24, 2009, The Patent Office.
Office Action issued by the Canadian Intellectual Patent Office dated Feb. 7, 2008 for corresponding Canadian Patent Application No. 2538561.
Office Action issued by the Canadian Intellectual Patent Office dated Jan. 14, 2008 for corresponding Canadian Patent Application No. 2538531.
Search Report issued by the European Patent Office dated Jun. 30, 2005 for corresponding European Patent Application No. 05101668.1.
Vanderdonckt, J. et al., "Flexible reverse engineering of web pages with Vaquista", Reverse Engineering, 2001. Proceedings. Eighth Working Conference on Oct. 2-5, 2001, Piscataway, NJ, USA, Oct. 2, 2001, pp. 241-248, XP010563208.
Bouillon, L et al., "Retargeting web pages to other computing platform with Vaquita", Reverse Engineering, 2002. Proceedings. Ninth Working Conference on Oct. 29-Nov. 1, 2002, Piscataway, NJ, USA, Oct. 29, 2002, pp. 339-348, XP010624986.
Chan, M. et al., "Extracting Web design knowledge: the Web De-Compiler", Multimedia Computing and Systems, 1999. IEEE International Conference on Florence, Italy Jun. 7-11, 1999, Los Alamitos, CA, USA, IEEE Comput. Soc, US, vol. 2, Jun. 7, 1999, pp. 547-552, XP010519447.
Second Examination Report issued by the European Patent Office dated Mar. 8, 2007 for corresponding European Patent Application No. 05101668.1.
Microsoft Corporation, "Asp.Net Technical Articles - Validation", pp. 1-7, Oct. 2003, http://msdn2.microsoft.com/en-us/library/aa478993(d-printer).aspx.
Second Examination Report issued by the European Patent Office dated Jun. 13, 2008 for corresponding European Patent Application No. 05101667.3.
Yu Ping, et al., "Transforming Legacy Web Applications to the MVC Architecture", Sep. 19, 2003, XP010752255.
Third Examination Report issued by the European Patent Office dated Apr. 2, 2008 for corresponding European Patent Application No. 05101668.1.
United Kingdom combined Search and Examination Report for UK Application No. GB0604288.1 dated May 11, 2006, the Patent Office.
Second United Kingdom Examination Report for UK Application No. GB0604288.1 dated Apr. 10, 2007, The Patent Office.
Third United Kingdom Examination Report for UK Application No. GB0604288.1 dated Aug. 2, 2007, The Patent Office.
Fourth United Kingdom Examination Report for UK Application No. GB0604288.1 dated Feb. 29, 2008, The Patent Office.
United Kingdom combined Search and Examination Report for UK Application No. GB0604281.6 dated May 11, 2006, The Patent Office (Cited from IDS previously filed in Jun. 2006.

Oracle TopLink 10g Release 3 (10.1.3.1.0), Oct. 2006, http://www.oracle.com/technology/products/ias/toplink/ technical/tl10g_fov.htm.

Second United Kingdom Examination Report for UK Application No. GB0604281.6 dated Apr. 5, 2007, The Patent Office.

Third United Kingdom Examination Report for UK Application No. GB0604281.6 dated Aug. 3, 2007, The Patent Office.

Fourth United Kingdom Examination Report for UK Application No. GB0604281.6 dated Feb. 29, 2008, The Patent Office.

* cited by examiner

SYSTEM AND METHOD FOR APPLYING WORKFLOW OF GENERIC SERVICES TO COMPONENT BASED APPLICATIONS FOR DEVICES

BACKGROUND

This application relates generally to generation of applications for communication of services over a network to a device.

There is a continually increasing number of devices in use today, such as two-way devices, mobile telephones, PDAs with wireless communication capabilities, self service kiosks and two-way pagers. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing software applications for a variety of devices remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of device platform, thereby providing a relatively optimized application program for each runtime environment. However, native applications have disadvantages of not being platform independent, thereby necessitating the development multiple versions of the same application, as well as being relatively large in size, thereby taxing the memory resources of the device. Further, application developers need experience with programming languages such as Java and C++ to construct these hard coded native applications. There is a need for application programs, other than page-based applications, that can be run on client devices having a wide variety of runtime environments, as well as having a reduced consumption of device resources.

The systems and methods disclosed herein provide a conversion capability to transform page-based applications to component based applications including workflow to obviate or mitigate at least some of the above presented disadvantages.

SUMMARY

Currently, devices are configured to communicate with Web Services and other data sources through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of device platform, thereby providing a relatively optimized application program for each runtime environment. However, native applications have disadvantages of not being platform independent, thereby necessitating the development multiple versions of the same application, as well as being relatively large in size, thereby taxing the memory resources of the device. There is a need for application programs, other than page-based applications, that can be run on client devices having a wide variety of runtime environments, as well as having a reduced consumption of device resources.

Contrary to the current use of page-based applications, there are disclosed systems and methods for providing a conversion capability to transform page-based applications to component based applications with associated workflow components.

Accordingly, a method is disclosed for representing a workflow for a plurality of components corresponding to a page-based application, the plurality of components for configuring as a component based application to assist with messaging over a network between a device and a schema-defined service of a data source, the page-based application configured as a series of presentation pages including embedded data, messaging and presentation elements for interaction with a user interface, the method comprising the steps of: selecting a plurality of components including a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language; selecting a plurality of dependency links associated with events corresponding to the embedded elements, the dependency links for describing the workflow of the plurality of components in respect to operation of the component based application when executed on the device; generating in an instructional language a set of instructions based on the dependency links, the set of instructions for coordinating the operation of the plurality of components; and inserting the set of instructions in a workflow component; wherein the plurality of components and the workflow component are subsequently packaged as the component based application.

Also disclosed is a system for representing a workflow for a plurality of components corresponding to a page-based application, the plurality of components for configuring as a component based application to assist with messaging over a network between a device and a schema-defined service of a data source, the page-based application configured as a series of presentation pages including embedded data, messaging and presentation elements for interaction with a user interface, the system comprising: a component storage module for providing a plurality of components including a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language, and for providing a plurality of dependency links associated with events corresponding to the embedded elements, the dependency links for describing the workflow of the plurality of components in respect to operation of the component based application when executed on the device; and a workflow module generating in an instructional language a set of instructions based on the dependency links, the set of instructions for coordinating the operation of the plurality of components and for inserting the set of instructions in a workflow component; wherein the plurality of components and the workflow component are subsequently packaged as the component based application.

Also disclosed is a computer program product for representing a workflow for a plurality of components corresponding to a page-based application, the plurality of components for configuring as a component based application to assist with messaging over a network between a device and a schema-defined service of a data source, the page-based application configured as a series of presentation pages including embedded data, messaging and presentation elements for interaction with a user interface, the computer program product comprising: a computer readable medium; a component storage module stored on the computer readable medium for providing a plurality of components including a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language, and for providing a plurality of dependency links associated with events corresponding to the embedded elements, the dependency links for describing the workflow of the plurality of components in respect to operation of the component based application when executed on the device; and a workflow module coupled to the storage module for generating in an instructional language a set of instructions based on the dependency links, the set of instructions for coordinating the operation of the plurality of components and for inserting the set of instructions in a workflow component; wherein the plurality of components and the workflow component are subsequently packaged as the component based application.

BRIEF DESCRIPTION OF THE DRAWINGS

These and other features will become more apparent in the following detailed description in which reference is made to the appended drawings wherein.

DESCRIPTION

Figure 1:
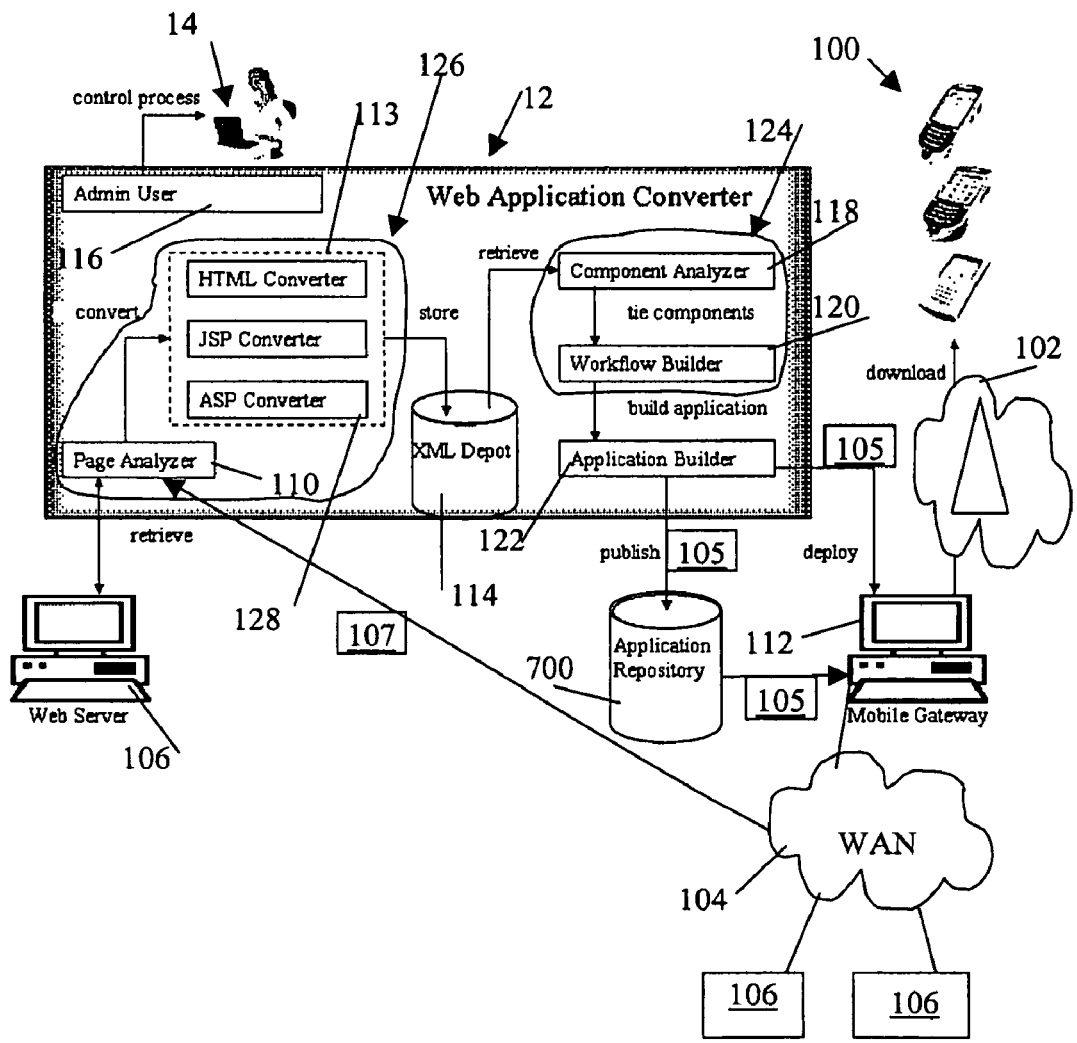
FIG. 1 is a block diagram of a network system with conversion tools.

Referring to FIG. 1, a network system 10 comprises a plurality of generic devices 100 for interacting with one or more generic schema defined services provided by one or more data sources 106 (and associated data servers) via a coupled Wide Area Network (WAN) 104 such as but not limited to the Internet. These generic devices 100 can be wireless devices such as but not limited to two-way devices, mobile phones, PDAs, self-service kiosks and the like. The generic services provided by the data source 106 can be Web Services and/or other services such as but not limited to SQL Databases, IDL-based CORBA and RMI/IIOP systems, Legacy Databases, J2EE, SAP RFCs, and COM/DCOM components. It is recognized that each data source 106 can have an associated pre-compiled (e.g. executable) application 107, for downloading/uploading to the device 100, configured for executing on a specific device platform. The compiled application 107 is executed on the device 100 so as to establish a client-server relationship between the device 100 and the data source 106 respectively. Further, the system 10 has a gateway server 112 coupled to a wireless network 102 for connecting the devices 100 to the WAN 104. It is recognized that other devices and computers (not shown) could be connected to the data sources 106 via the WAN 104 and associated networks other than as shown in FIG. 1. Web services are selected as an example data source 106 for the following description of the system 10, for the sake of simplicity. However, it is recognized that other generic schema defined services could be substituted for the web services 106, if desired. Further, the networks 102, 104, of the system 10 will hereafter be referred to as the network 104, for the sake of simplicity.

Referring again to FIG. 1, a series of conversion tools 12 are used to convert the code (e.g. source code) of a compiled web application 107 into a series of descriptors using a selected structured definition language (e.g. XML). The page content of the application 107 have embedded data elements, embedded message elements and embedded presentation elements. The application 107 is converted into a component application 105, as further described below. The tools 12 can be used to convert commonly used web applications 107 into XML-defined component applications 105, organized as groups of XML descriptors in the form of a plurality of interactive components 400, 402, 404, 406 (see FIG. 4 as further described below). The conversion process of the tools 12 is based on structural code analysis of the original application 107 (e.g. web pages) of the web service 106, and then on application of mapping patterns and associated conversion logic to convert these application 107 pages into the set of structured language (e.g. XML) defined components 400, 402, 404 augmented by scripting/command language (e.g. Java Script) defined workflow components 406. The selected structured definition language and the selected scripting/command language are chosen or otherwise predefined for use by the tools 12 in expressing the descriptors and workflow of components 400, 402, 404, 406 (see FIG. 4) that comprise the converted component application 105. It is noted that the selected structured definition language is hereafter referred to as XML for the sake of simplicity. Further, it is noted that the selected scripting/command language is hereafter referred to as Java Script for the sake of simplicity. However, it is recognized that other selected languages could be substituted for the XML and/or Java Script, if desired.

Client-Server Interaction Through Network Messaging

Referring again to FIG. 1, the devices 100 transmit and receive requests/response messages, respectively, over the network 104 when in communication with the web services 106. The transmission and reception of the messages is enabled through interaction with the component application 105 when first provisioned and then executed on the device 100. The devices 100 can operate as web clients of the web services 106 by using the requests/response messages are defined by the component application 105 in the form of message header information and associated data content, for example requesting and receiving product pricing and availability from an on-line merchant. It is recognized that the component application 105 is provided to the device 100 as a plurality of uncompiled components 400, 402, 404, 406, each expressed in the selected XML and/or Java Script languages, for providing defined application data functions (i.e. data components 400), defined application message functions (i.e. message components 404), defined application presentation functions (i.e. presentation components 402) and defined application workflow functions (i.e. workflow components 406). The uncompiled component application 105 is received by the device 100 as the series of the interactively defined components 400, 402, 404, 406, which are subsequently provisioned in executable form on a device runtime 206 (see FIG. 2) to operate as the client application 105 for communication with the web service(s) through messaging, as further described below. The web service 106 is an example of a system with which component applications 105 interact via the network 104 in order to provide utility to users of the communication devices 100. The messages sent between the communication devices 100 and the web service 106 could traverse a message-map service (not shown) of the server 112, which would convert the messages between any differing formats used by the devices 100 and the web services 106.

For satisfying the appropriate requests/response messages, the web services 106 can communicate with the server 110 through various protocols (such as but not limited to HTTP and component API) for exposing relevant business logic (methods) of the web services 106 to the component application(s) 105 provisioned on the device 100. The provisioned component applications 105 can use the business logic of the web services 106 similarly to calling a method on an object (or a function). It is recognized that the component applications 105 can be downloaded/uploaded in relation to the server 112, through the messages via the network 104, directly to the devices 100. The web services 106 provide information messages which are used by the component applications 105 running on the devices 100. Alternatively, or in addition, the web services 106 may receive and use the information messages provided by the component applications 105, perform tasks on behalf of component applications 105, and/or enable asynchronous messaging for server 112 to device 100 notifications.

The web service 106 can be defined as a software service, which can implement an interface such as expressed using Web Services Description Language (WSDL) registered in a Universal Discovery Description and Integration (UDDI) services registry, and can communicate through messages with client devices 100 by being exposed over the network 104 through an appropriate protocol such as but not limited to the Simple Object Access Protocol (SOAP). In some implementations, SOAP is a specification that defines the XML format for the messages associated with the executing component application 105, including a well-formed XML fragment enclosed in SOAP elements. For example, the SOAP request message can contain a callable function, and the parameters to pass to the function, which is sent (according to the message and data format described in the components 400, 404 of the component application 105) from the client device 100, and the service 106 then returns the response message (also according to the expected message and data format described in the components 400, 404) with the results of the executed function. It is recognized that the messaging between the device 100 and web service 106 can include synchronous and/or asynchronous communication messages. Alternatively, the web service 106 may use known communication protocols, message formats, and the interface may be expressed in web services languages other than described above.

Device 100 and Runtime Environment 206

Figure 2:
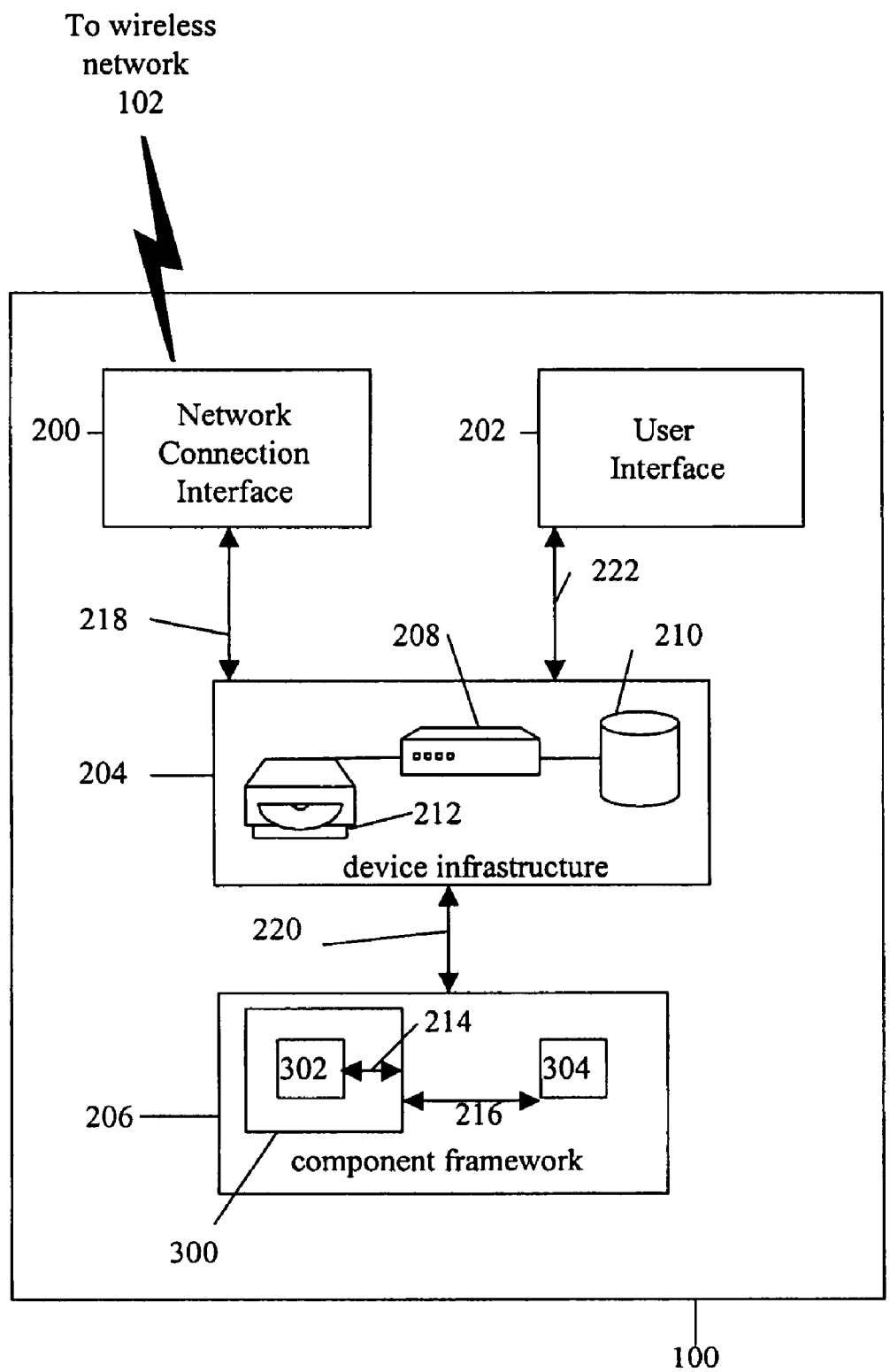
FIG. 2 is a block diagram of a generic device of FIG. 1.

Referring to FIG. 2, the devices 100 are devices such as but not limited to mobile telephones, PDAs, two-way pagers or dual-mode communication devices. The devices 100 include a network connection interface 200, such as a wireless transceiver or a wired network interface card or a modem, coupled via connection 218 to a device infrastructure 204. The connection interface 200 is connectable during operation of the devices 100 to the network 104, such as to the wireless network 102 by wireless links (e.g., RF, IR, etc.), which enables the devices 100 to communicate with each other and with external systems (such as the web service 106) via the network 104 and to coordinate the requests/response messages between the component applications 105 and the service 106. The network 104 supports the transmission of data in the request/response messages between devices 100 and external systems (e.g. data sources 106), which are connected to the network 104. The network 104 may also support voice communication for telephone calls between the devices 100 and devices which are external to the network 104. A wireless data transmission protocol can be used by the wireless network 102, such as but not limited to DataTAC, GPRS or CDMA.

Referring again to FIG. 2, the devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the device 100 to coordinate the requests/response message messages over the network 104 (see FIG. 1) as employed by component applications 105, further described below.

Referring again to FIG. 2, operation of the device 100 is enabled by the device infrastructure 204. The device infrastructure 204 includes the computer processor 208 and the associated memory module 210. The computer processor 208 manipulates the operation of the network interface 200, the user interface 202 and the runtime environment 206 of the communication device 100 by executing related instructions, which are provided by an operating system and component applications 105 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the component applications 302 are transmitted via the network 104 and loaded into the memory module 210 of a device infrastructure 204 of the device 100. Alternatively, the component applications 105 may be loaded via a serial connection, a USB connection, or a short-range wireless communication system such as IR, 802.11(x) Bluetooth™ (not shown). Once loaded onto the device 100, the component applications 105 can be executed by a runtime environment 206 of the device 100, which provisions the component applications 105 into an executable form, which is then executed by the processor 208 in the device infrastructure 204. For example, the component applications 105 may be executed as native code or interpreted by another software module or operating system on the device 100, as further described below with reference to FIG. 4b. In any event, the component applications 105 are run in the terminal runtime environment 206 provided by the device 100.

Referring again to FIG. 1, the client runtime environment can be configured to make the devices 100 operate as web clients of the web services or any other generic schema-defined services supplied by the data sources 106. The client runtime environment 206 is preferably capable of generating, hosting and executing the component applications 105 on the device 100. Therefore, the native runtime environment 206 is an interface to the device 100 functionality of the processor 208 and associated operating system of the device infrastructure 204. Further, specific functions of the runtime environment 206 can include such as but not limited to support for language, coordinating memory allocation, networking, management of data during I/O operations, coordinating graphics on an output device of the devices 100 and providing access to core object oriented classes and supporting files/libraries.

The terminal runtime environment 206 can be referred to as a smart host container for the component application 105, and can be responsible for analyzing message meta-data (of the messages) and for updating the representation of the meta-data in the memory module 210. The terminal runtime environment 206 preferably supports the following basic functions for the resident executable versions of the component applications 105, functions such as but not limited to:

provide a communications capability to send messages to the Web Services 106 or messages to any other generic schema defined services connected via the network 104 to the devices 100;

provide data input capabilities by the user on an input device of the devices 100 to supply data parts for Web Services' 106 outgoing messages;

provide data presentation or output capabilities for Web Services' 106 response messages (incoming messages) or uncorrelated notifications of the web service 106 on the output device;

provide data storage services to maintain local client data in the memory module 210 (see FIG. 2) of the device 100; and provide an execution environment for the scripting language for coordinating operation of the application components 400, 402, 404, 406 (see FIG. 4) of the component applications 105.

Figure 4:
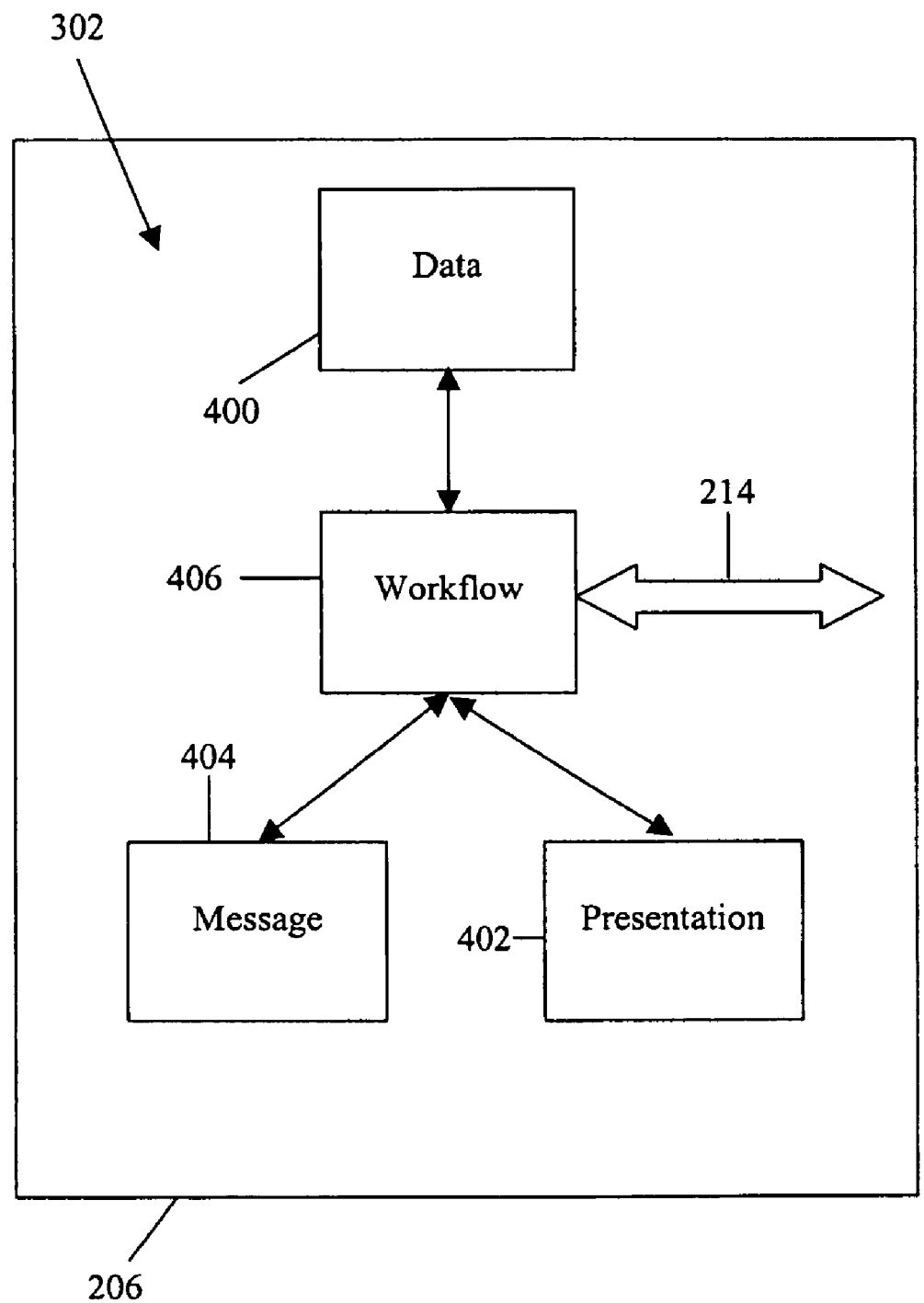
FIG. 4 is a block diagram of a component application of FIG. 2.
Figure 4A:
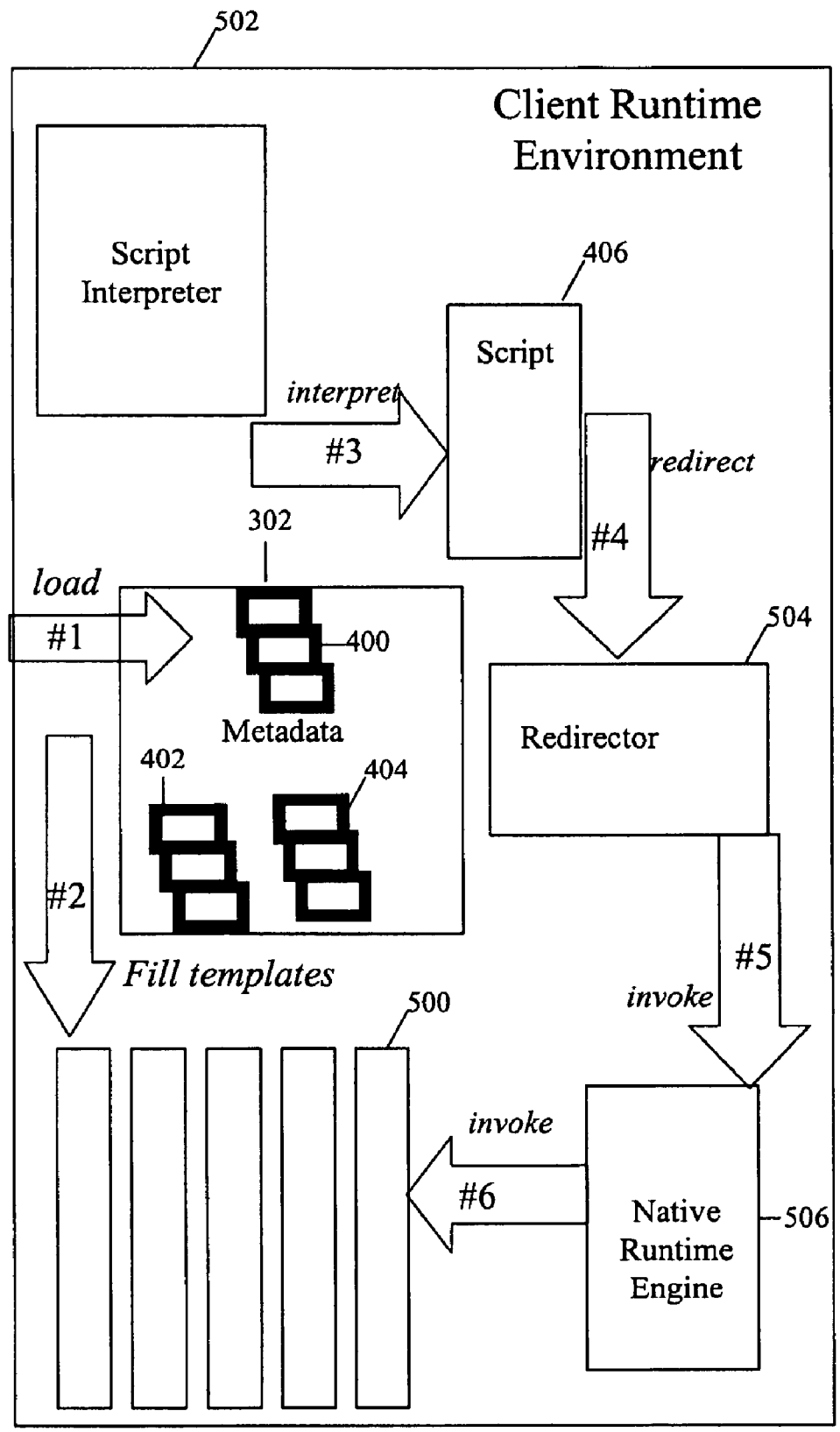
FIG. 4*a* shows a representative application packaging and hosting model for the system of FIG. 1.

Referring to FIGS. 2, 4 and 4a, the client runtime environment 206 loads the raw metadata contained in the component 400, 402, 404, 406 definitions and the builds the executable version of the application program 302 on the device 100. For example, there can be two operational models/modes for client runtime: a template-based native execution mode and a metadata-based execution mode. With the template-based native execution model the runtime hosts data, message, and screen templates 500 pre-built on the device 100 using the native code. When the component application 105 definitions are loaded, the runtime environment 206 fills the templates 500 with metadata-defined parameters from the components 400, 402, 404 and builds the executable component application 105 in the native format. The workflow script (for example Java Script) of the workflow component 406 could be either converted to native code or executed using an appropriate script interpreter 502 to a native code redirector 504, where the redirector 504 interprets calls to the scripting language into operations on native components through a native runtime engine 506. With the metadata-based execution, the runtime environment 206 either keeps component 400, 402, 404, 406 definitions in XML (for example), which are parsed during execution time or uses native representation of XML (for example) nodes. During execution, the native runtime engine 506 operates on definitions of the components 400, 402, 404, 406 rather than on native component entities. It is recognized that the template based approach can be more performance efficient over the metadata based execution, but can require a more sophisticated execution environment and more memory resources.

Figure 3:
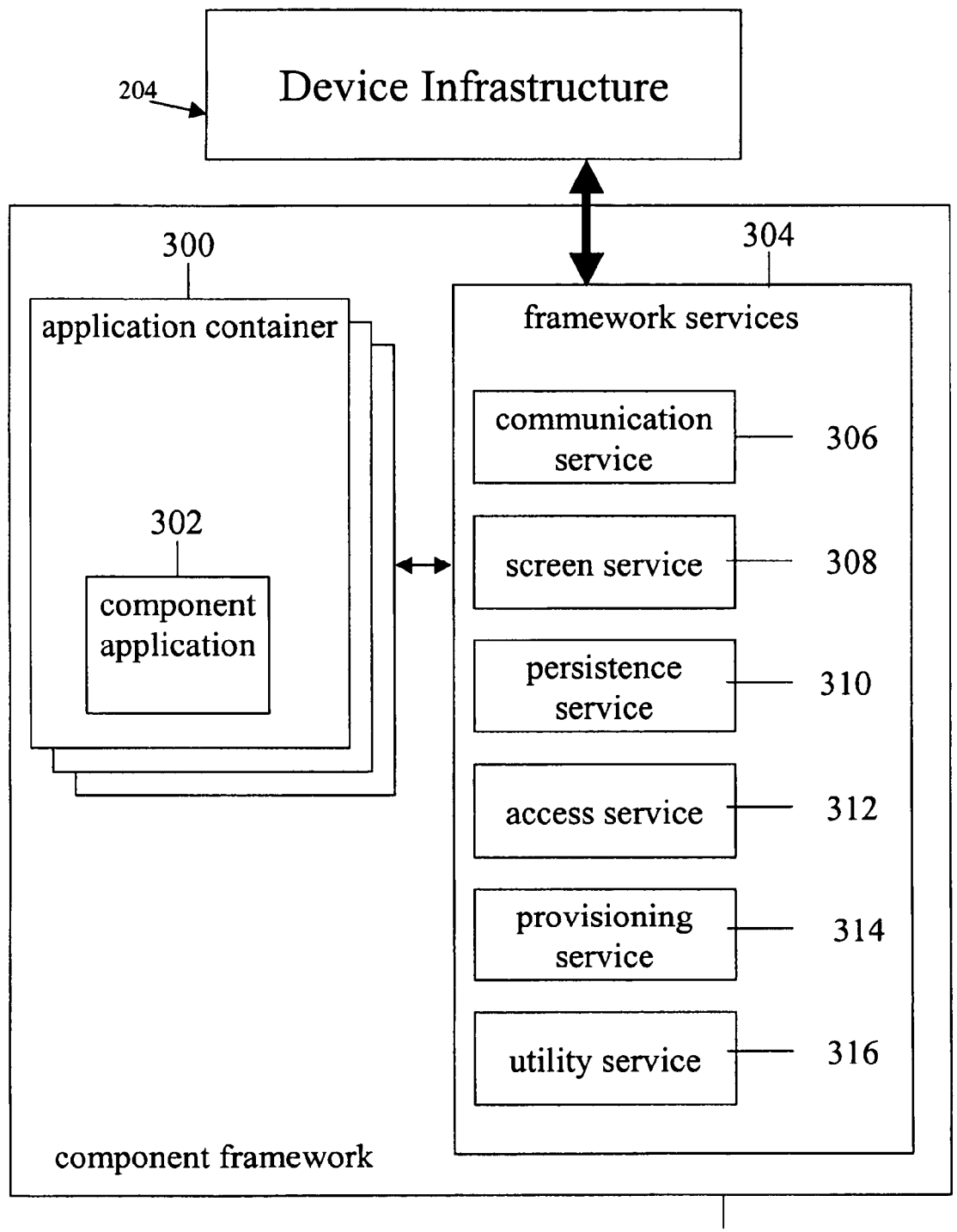
FIG. 3 is a block diagram of a runtime environment of the device of FIG. 2.

Referring again to FIG. 3, the runtime environment 206 can also provide framework services 304 (a standard set of generic services) to the component applications 105, in the event certain services are not included as part of the components 400, 402, 404, 406 (see FIG. 4) or received as separate components (not shown) as part of the component applications 105. As a result, the component applications 105 can have access to the functionality of the communication device 100 without having to implement it. The component application 105 has communications 214 with the runtime environment 206, which coordinates communications 216 with the framework services 304, as needed. The framework services 304 of the runtime environment 206 coordinate communications via the connection 220 with the device infrastructure 204. Accordingly, access to the device infrastructure 204, user interface 202 and network interface 200 is provided to the component applications 105 by the runtime environment 206. The framework services 304 can include services such as but not limited to a communication service 306, a presentation service 308, a persistence service 310, an access service 312, a provisioning service 314 and a utility service 316. The communication service 306 manages connectivity between the component applications 105 and the external system 10, such as the messages and associated data sent/received in respect to the web service 106 (by the communication service 306) on behalf of the component applications 105. The presentation service 308 manages the representation of the component applications 105 as they are output on the output device of the user interface 202 (see FIG. 2). The persistence service 310 allows the component applications 105 to store data in the memory module 210 (see FIG. 2) of the device infrastructure 204. The access service 312 provides the component applications 105 access to other non-component based software applications which are present on the communication device 100. The provisioning service 314 manages the provisioning of software applications on the communication device 100. Application provisioning can include requesting and receiving new and updated component applications 105, configuring component applications 105 for access to services which are accessible via the network 104, modifying the configuration of component applications 105 and services, and removing component applications 105 and services. The utility service 316 is used to accomplish a variety of common tasks, such as performing data manipulation in the conversion of strings to different formats.

Component Application 105

Referring to FIG. 2, component applications 105 are executed within the terminal runtime environment 206, which supports access to Web Service 106 operations (see FIG. 1).

WSDL and SOAP protocol definitions clearly imply a messages/data pattern. In a WSDL Web Service definition, the operations are defined using the notion of messages and data parts, which are used to define the Web Service component applications 105 as a set of the related data 400 and the message 404 components (see FIG. 4).

Referring to FIG. 4, a block diagram of the component applications 105 comprises the data components 400, the presentation components 402 and the message components 404, which are coordinated by workflow components 406 through communications 214 with the runtime environment 206. The structured definition language can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS).

Referring again to FIG. 4, the data components 400 define data entities which are used by the component application program 302. Examples of data entities which data components 400 may describe are orders, users, and financial transactions. Data components 400 define what information is required to describe the data entities, and in what format the information is expressed. For example, the data component 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400. Since data parts (elements) are usually transferred from message to message according to Web Services 106 choreography rules, preferably there is persistence of data components 400. Data components 400 may be dynamically generated according to Web Service(s) 106 choreography definitions (if available) or defined by the application 105 designer based on complex type definitions and/or message correlation information.

Referring again to FIG. 4, the message components 404 define the format of messages used by the component applications 105 to communicate with external systems such as the web service 106. For example, one of the message components 404 may describe such as but not limited to a message for placing an order which includes the unique identifier for the order, the status of the order, and notes associated with the order. Message component 404 definitions written in the structured definition language can uniquely represent (and map to) WSDL messages, and can be generated dynamically at runtime. Accordingly, the dynamic generation can be done for the component definitions for component applications 105, and associated data content, from standard Web Service 106 metadata in the definition language used to express the web service interface, for example such as but not limited to WSDL and BPEL. Web Service 106 messages are defined within the context of operation and there is defined correlations between the message components 404 in the component applications 105 definitions. This correlation could be done using predefined message parameters and/or through separate workflow components 406, as further defined below.

Referring again to FIG. 4, the presentation components 402 define the appearance and behavior of the component applications 105 as it displayed by the user interface 202. The presentation components 402 can specify GUI screens and controls, and actions to be executed when the user interacts with the component applications 105 using the user interface 202. For example, the presentation components 402 may define screens, labels, edit boxes, buttons and menus, and actions to be taken when the user types in an edit box or pushes a button. The majority of Web Service 106 consumers use a visual presentation of Web Service 106 operation results, and therefore provide the runtime environment 206 on their devices 100 capable of displaying user interface screens.

Figure 4B:
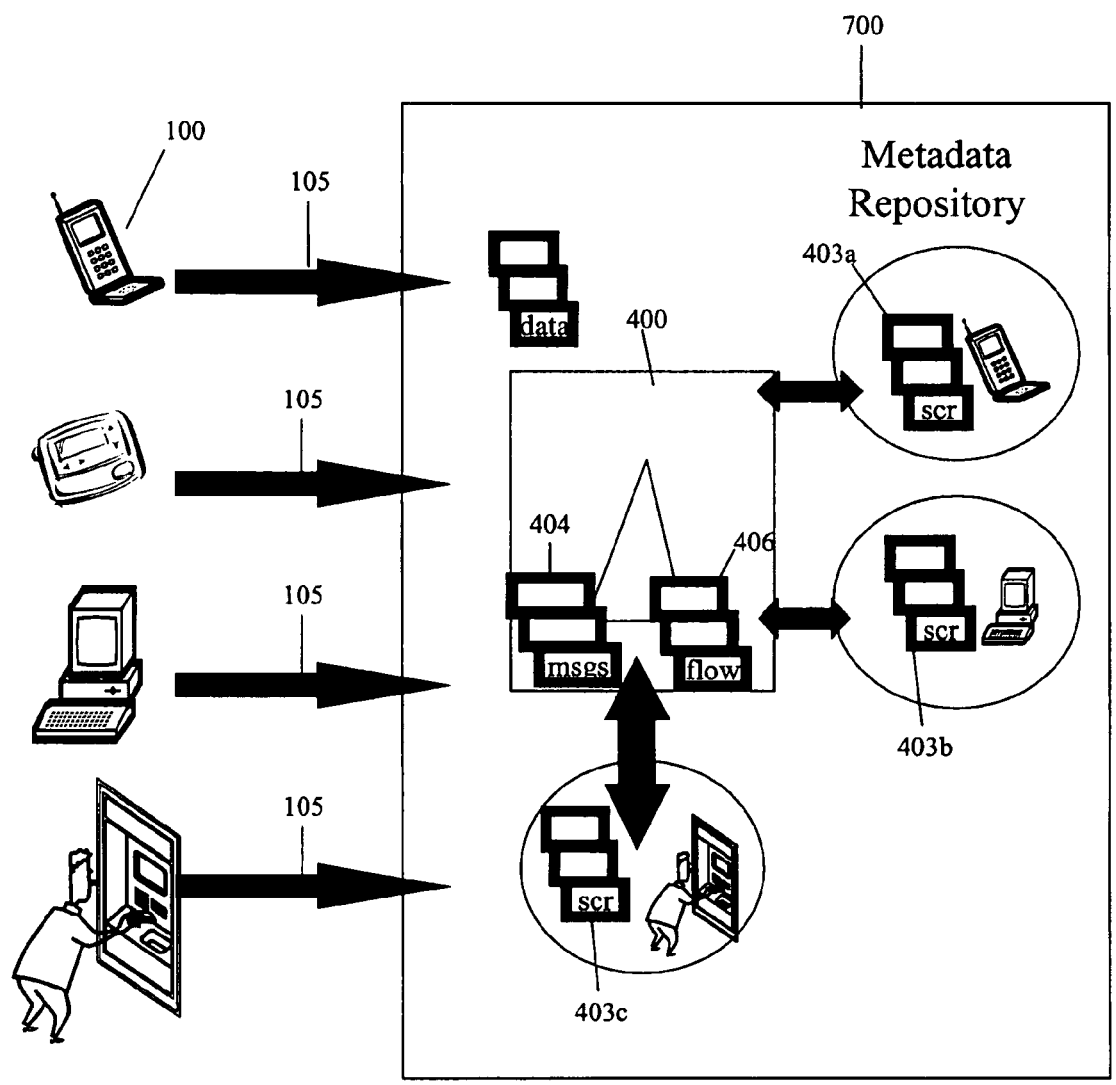
FIG. 4*b* is a model of a client runtime of the device of FIG. 1.

Referring to FIGS. 1, 4 and 4*b*, it is recognized that in the above described component applications 105 definitions hosting model, the presentation components 402 may vary depending on the client platform and environment of the device 100. For example, in some cases Web Service 106 consumers do not require a visual presentation. The application definition of the components 400, 402, 404, 406 of the component applications 105 can be hosted in a Web Service 106 registry in a metadata repository 700 (see FIG. 1) as a bundle of platform-neutral data 400, message 404, workflow 406 component descriptors with a set of platform-specific presentation component 402 descriptors for various pre-defined client runtimes (i.e. specific runtime environments 206—see FIG. 2). When the discovery or deployment request message for the component application 105 is issued (either by the device or by the data source 106), the client type could be specified as a part of this deployment message. In order not to duplicate data, message, and workflow metadata while packaging component applications 105 for different client platforms of the devices 100, application definitions can be hosted in the repository 700 as a bundle of platform-neutral component definitions linked with different sets of presentation components 403*a*, 403*b*, 403*c*, representing the different supported user interfaces 202 of the devices 100. It is also recognized that a standard presentation component 402 can be used in the event the specific device 100 is not explicitly supported, thereby providing at least a reduced set of presentation features. When a user makes a discovery or download request message to the server 112 (see FIG. 1), the client runtime type of the devices 100 is validated along with the intended data source 106, and the proper component application 105 bundle is constructed for delivery by the server 112 to the device 100 over the network 104. For those Web Service 106 consumers, the component applications 105 could contain selected presentation components 403*a,b,c* linked with the data 400 and message 404 components through the workflow components 406, thereby providing a customized component application 105.

Referring again to FIG. 4, the workflow components 406 of the component application 105 define processing that occurs when an action is to be performed, such as an action specified by a presentation component 402 as described above, or an action to be performed when messages (see FIG. 1) arrive from the system 10. Presentation workflow and message processing are defined by the workflow components 406. The workflow components 406 are written as a series of instructions in the selected programming/scripting language, such as but not limited to Java Script, and can be compiled into native code and executed by the runtime environment, as described above. An example of the workflow components 406 may be to assign values to data, manipulate screens, or send the message. The workflow component 406 supports a correlation between the messages and defines application flow as a set of rules for operations on the other components 400, 402, 404. Multiple workflow components can be defined with respect to a given component application 105. Such additional workflow components, similar to the multiple presentation components 403a, 403b, 403c, can define differing work flows based upon different supported capabilities or feature of particular devices 100.

Component Application Program Example

Accordingly, referring to FIG. 4, the client application programs 302 can be defined as a set of platform-neutral component definitions, namely for data 400 and message 404 components, and presentation components 402 using XML (or any other suitable structured definition language). The workflow components 406 can be defined using Java Script (or any other suitable platform-neutral scripting language). The client runtime environment of the component framework 206 (see FIG. 2) can generate component templates based on meta-definitions, as further described below, when the components 400, 402, 404, 406 of the component application 105 are provisioned on the device 100.

The following example shows how a Web Services 106 component application 105 could be expressed using a structured definition language, such as but not limited to XML, and a platform neutral scripting/programming language, such as but not limited to Java Script, defined components:

Example XML Data Components 400

```
<data name="Order">
    <item name="orderId" type="Number" key="true"/>
    <item name="items" type="String" array="true"/>
    <item name="user" comp="true" compName="User"/>
    <item name="orderStatus" type="String"/>
</data>
...
```

Example XML Message Components 404

```
<msg name="ordConfirmation" type="response" action="mhConfirmation">
    <part name="orderId" type="String"/>
    <part name="status" type="String"/>
</msg>
...
```

Example XML Presentation Components 402

```
<screen name="scrConfirmation" title="Order Confirmation" param="Order">
    <layout type="vertical">
    <widget type="label" value="Order Confirmation Result:"/>
        <widget type="edit" value="@Order.orderStatus"/>
    </layout>
    ...
    <menu>
        <item label="Continue" navigate="@scrMain"/>
        ...
    </menu>
</screen>
...
```

Example Java Script Workflow Components 406

```
<actions>
    <function name="mhConfirmation">
    key = ordConfirmation.orderId;
    order = Order.get(key);
    order.orderStatus = ordConfirmation.status;
    scrConfirmation.display(order);
    </function>
    ...
</actions>
```

Referring to FIG. 4, as given above, it can be seen that the message components 404 relay the required data for the input and output of the messages associated with the applications 105 executing on the device 100. The corresponding data components 400 coordinate the storage of the data in the memory module 210 (see FIG. 2) of the device 100 for subsequent presentation on the user interface 202 (see FIG. 2) by the presentation components 402. The workflow components 406 coordinate the transfer of data between the data 400, presentation 402, and message 404 components.

There are a number of potential advantages to the component application model as described above. For example, there is a minimized need for a mediator in the service protocol between client runtime and service endpoint. Unlike browser-based applications 107 that require a Web Server to host additional components (e.g. servlets, JSP, ASP, etc.) to connect HTML pages data/requests with a service endpoint, the component application model allows end-to-end direct connectivity between the client runtime of the device 100 and the service endpoint using Web Service 106 based message component definitions.

Further, the component application 105 model combines the simplicity of browser-based applications with the efficiency of native application execution. Unlike browser applications 107, rendering screens at runtime is minimized as the whole component application 105 definition is downloaded preferably at once and the client runtime environment 206 can generate a native representation of application screens. Additionally, requesting of pages (screen definitions in HTML) from the server is minimized, as the component application model architecture is based on message components 404 that contain data.

Further, the component application 105 architecture can provide a relatively small application download size consisting of component definitions only, as compared to hard coded and compiled native applications 107, and can provide an effective data storage and persistence model. The client runtime 206 is capable of storing and updating atomic data entities directly vs. manipulating rendered presentations such as HTML pages for browser applications.

Further, the component application architecture can provide a platform-neutral model. Unlike native applications uniquely developed for a specific client runtime, the applications 105 built using widely adopted standards such as XML and Java Script could be reused on a large variety of platforms and truly implement the principle "write once run everywhere". Further, the combination of non-procedural and procedural application definitions can greatly reduce programming time and effort.

Conversion Tools 12

Referring to FIG. 1, the conversion tools 12 are executed on a computer 14 and are used to generate component applications 105 through the conversion of non-component page based applications 107, as further described below. The completed component applications 105 are sent directly to the gateway server 112 and/or to the repository for storage and subsequent retrieval. The gateway server 112 coordinates the upload/download of the component applications 105 with respect to the devices 100, such that the component applications 105 facilitate communication between the devices 100 and the data sources 106 as described above. The tools 12 include the following modules: a page analyzer module 110, a conversion module 113, a component storage module 114, a user interface module 116, a component optimizer module 118, a workflow component generator module 120 and a component application builder module 122. It is recognized that the modules could operate in a manual mode, a semi-automated mode, or an automated mode in connection with the user of the computer 14, as further described below. In addition, the page analyzer module 110 and the conversion module 113 could be implemented on the user computer as a separate application converter tool 126, for generation of components 400, 402, 404 from the input page-based application 107. Similarly, the component optimizer module 118 and/or the workflow generator module 120 could be implemented on the user computer as a separate workflow tool 124. Likewise, the application builder module 122 could be implemented on the user computer as a separate application builder tool. The features and functionality of the individual tools 124, 126 and modules 110,113,114,116,118,120,122 are further described below.

Pare Analyzer Module 110

The page analyzer module 110 assembles the page metadata from the input application 107 from page analysis and/or from source code. For the source code example, the module 110 parses each presentation page/screen (i.e. display output to a user interface of a client computer) from the source code and then collects the metadata for each presentation page. The module 110 includes the characteristics of navigation and other user event links, presentation styles/format, page type and data dependencies for each set of page metadata corresponding to the respective pages of the input application 107. For the page analysis example, the module 110 validates the presented web page displayed on the user interface 502 (see FIG. 5) of the user computer 14, analyzes the page type, retrieves the navigation and any other user event links, determines the page styles and formats, and notes the data dependencies. The module 110 then builds the representative metadata for each presentation page of the input application 107. The page metadata for each presentation page of the input application is then made available to the conversion module 113. It is recognised that the module 110 could also be coupled to a comparison module 600 (see FIG. 6) for determining the scale of the pages of the application 107 as compared to the best suited scale of the presentation content (of the pages) for the UI 202 of the device.

Conversion Module 113

The conversion module 113 can have a series of page converters 128 (e.g. XML, HTML, JSP, ASP, etc.) for converting each page metadata into their respective components 400, 402, 404. The module 113 receives the page metadata from the page analyzer module 110 and confirms the scale (e.g. size) of the page presentation contents (according to UI 202—see FIG. 2—capabilities of the device 100 as well as format/style of the presentation page/screen contents). If needed, the module 113 splits the page metadata into page metadata subsets representing subpages suitable for presentation on mobile device 100. The module 113 then extracts from the metadata set/subset any data of the page presentation content suited for representation by data 400 and/or message 404 components, extracts the corresponding presentation format of the data suitable for representation by the presentation components 402, and extracts server communication interactions between the device 100 and the data sources 106 and/or server 112 suited for representation by message components 404. The module 113 then translates the page metadata into the selected structured definition language (if necessary) using language translation algorithms as are known in the art, and then the module 113 applies component patterns to convert or otherwise configure the translated page metadata into the component architecture required to build or otherwise generates the atomic screen 402, data 400, and message 404 XML components. The module 113 also generates an XML document containing dependency links (e.g. user events such as navigation) for representing the workflow of the generated components 400,402,404, as further described with reference to the workflow component generator module 120 below. It is recognised that the module 113 can include additional conversion modules such as but not limited to a data conversion module 602, a message conversion module 604 and a presentation conversion module 602.

Component Storage Module 114

The component storage module 114 can be considered an XML Depot for storing the XML defined components 400, 402, 404 and dependency link information generated for each processed presentation page metadata set/subset, as received from the conversion module 113. It is recognized that the module 114 can be a distinct module of the conversion tools 12 or simply a storage 510 of the user computer 14. When the pages of the input application 107 are processed, the data contents of the XML Depot are made available to the component optimizer module 118.

Component Optimizer Module 118

The component optimizer module 118 processes generated XML components 400, 402, 404 to identify common data components 400, message components 402 and screen components 404 and eliminates duplications between the various components generated for each respective set/subset of page metadata. Further, the module 118 can optimize links for direct screen transfers, screen to data mappings, and message to data mappings.

Figure 8:
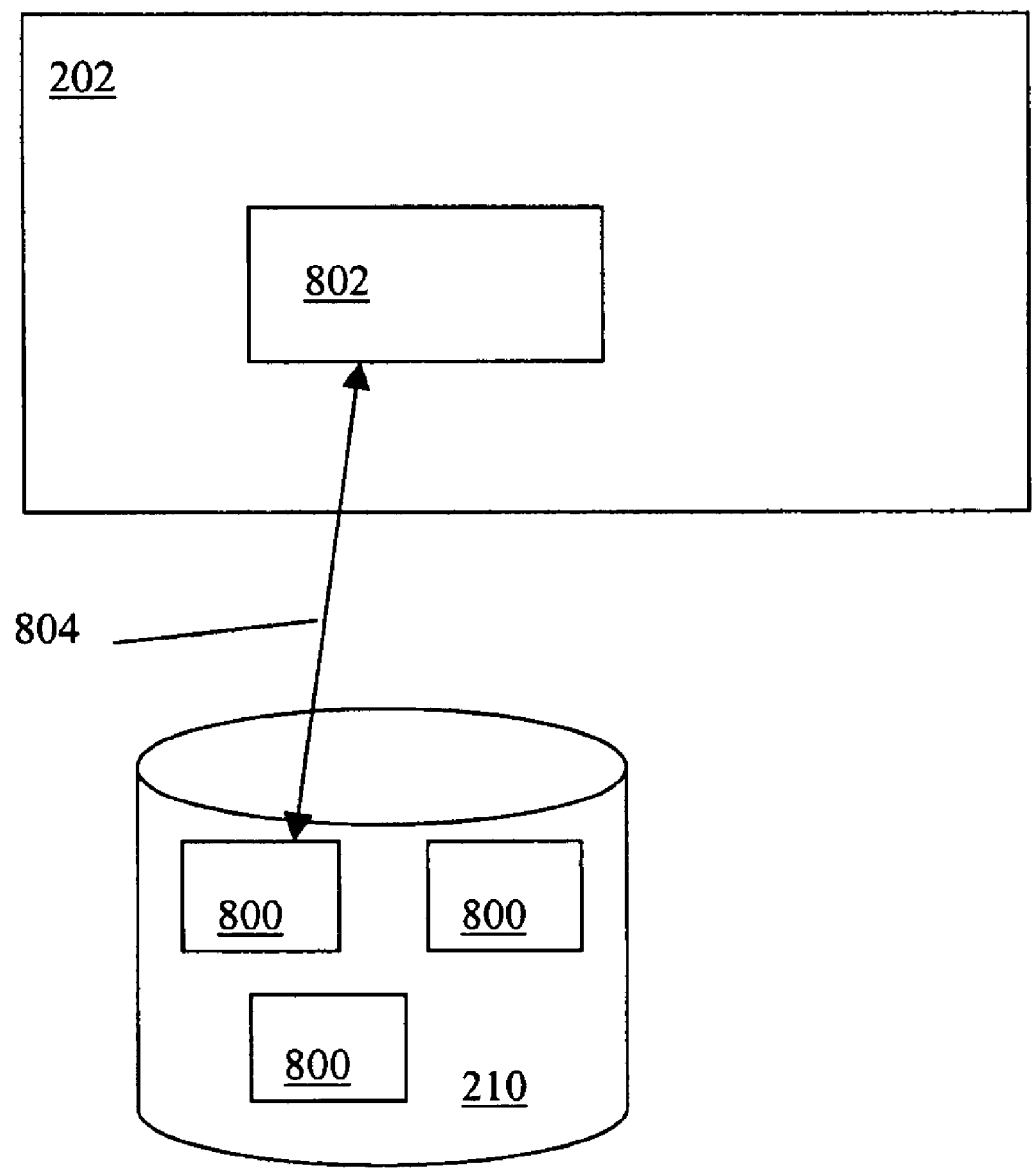
FIG. 8 is an example of screen-data mappings for the applications of FIG. 4.

An example of optimizing screen to data mappings is described with reference to FIG. 8, such that it is recognized that a similar example could be given for message to data mappings. In practice, typically the expression of the components 400, 402 can have overlapping content, while the behaviour of each of the components 400, 402 of the application 105 is distinct. Therefore, by recognizing the fact that user interface 202 (see FIG. 2) content is often generated from some underlying data element, and in light of the similarities between expression of these components 400, 402, it is convenient to introduce certain mappings 804 (see FIG. 8) to the expression of screen components 402, as further described below. Referring to FIGS. 4 and 8, these mappings 804 are essentially shortcuts to the expression of the screen elements 802 (screen element definitions) associated with the screen component 402, and how the screen component 402 behaves at runtime during execution of the application 105. The mapping 804 is a stated relationship between the screen element definitions of the screen component 402 and the data component 400 definition. In relation to expression of the screen component 402, using the mapping 804 can reduce the amount of metadata required to describe the component 402. Thus use of the mapping 804 can have a direct effect on the amount of "code" required to describe the application 105. In relation to how the component 402 behaves at runtime, the mapping 804 specifies how linked data elements (described by the data component 400) are resolved and affected by screen element 802 state. In this regard, specifying the mapping 804 can reduce the need for the developer to provide additional specific screen handling code in the application 302.

Referring to FIG. 8, screen representations of the screen components 402 (see FIG. 4) consist of screen elements 802, such as but not limited to UI controls, that are displayed on the user interface 202 and are associated with data field instances of the corresponding data objects 800. Therefore, each of the screen elements 802 is bound or mapped 804 to the fields of a respective data object 800. The device user of the application 105 can select screen elements 802 on the user interface 202 (see FIG. 2) and edit the controls within them, i.e. by user events. Any modifications of the screen elements 802 are propagated to the data object 800 mapped to the screen element 802. Similarly, all modifications (driven by the application 302 logic or incoming server messages 105) to the data objects 800 are reflected in the screen elements 802 mapped to these data objects 800. Tracking of the user events and any direct modifications to the data objects 800 can be monitored via a mapping manager of the runtime environment 206, as described below. The mapping 804 provides for identification and modification of the data object 800 affected by the mapping 804. The mapping 804 isolates the data object 800 of the data component 400 to which the screen element 802 of the corresponding screen component 404 is linked.

It is recognised that either the screen component 402 or data component 400 definitions contain the mapping 800, which defines the relationship between the data object 800 and screen element 802 or the relationship between an individual data field (or group of data fields) of the data object 800 with screen element 802. It is recognised that the data object 800 may be passed to the user interface 202 as a parameter. In this case the data field values of the data object 800 mapped to the screen element 804 would be extracted from the passed parameter. For example, an edit control (screen element 802) defined in a screen field definition of the screen component 402 could be mapped into a data field definition of the linked data component 400 (i.e. a one to one mapping 804) or a choice control (screen element 802) defined in a screen field definition of the screen component 402 could be mapped into a particular data field definition of a collection of data components 400 (i.e. a one to many mapping 804). It is recognized that similar mappings 804 could be used for message 402 and data 400 component mapping relationships. The mappings 804 can be stored in a mapping table (not shown) coupled to the mapping manager of the runtime environment 206.

Referring to FIGS. 4 and 8, screen component metadata can describe mapping to the data field definition of the linked data component 400 in addition to its other attributes. For example, a single screen element 802 may map to:
one of the data field definitions of the data component 400 or
all data field definitions of the data component 400 by a primary key (or mapping identifier)—in this case, the mapping 804 resolves to the primary key field.
A choice/list screen element 802 may map to:
a collection of all instances of the data components 400 or
one of the data field definitions of the data component 400 that is a collection.

The runtime environment 206 provides a system for effective management of the User Interface 202 by implementing the direct mappings 800 between the application data domain (data objects 800) and the UI screen elements 802 (e.g. UI controls). Changes to the application domain data objects 800 are automatically synchronized with the user interface 202, and user-entered data is automatically reflected in the application domain data objects 800. The primary mechanism behind this synchronization is the mapping 804 between paired screen element 802 and data object 800. The mapping system relates to applications 105 defined using metadata expressed in a structured language such as XML. The mapping 804 mechanism enables creation of dynamic and interactive screens on the user interface 202. All changes to the data object 800 can be synchronously reflected on the user interface and vice versa. The implementation of mappings 804 facilitates building the wireless applications 302 based on server-to-device notifications. The data object 800 updates asynchronously pushed from the server (web service 106) are synchronously reflected by the linked UI screen element 802 on the user interface 202. These mappings 800 can be applicable for a variety of wireless applications 105 such as stock trading, news updates, alerts, weather updates.

An example of the mappings 804 are as follows:
Example XML data component 400 'User' with primary key field 'name' can be defined using the following metadata:

<cData name="User" pkey="name"> <dfield name="name" type="String"/>
   <dfield name="street" type="String"/>
   <dfield name="city" type="String"/>
   <dfield name="postal" type="String"/>
   <dfield name="phone" type="String"/>
</cData>

Example XML presentation component 402 such that the 'scrAllUsers' screen can define a choice control 'cbNames' mapped to a 'name' field of all instances of the 'User' data component 400. The screen metadata definition contains a button or menu item with an action to display screen 'scrUserInfo' with parameter 'User' selected, passed as a parameter to the user interface 202.

<cScr name="scrAllUsers">
. . .
<choice name="cbNames" mapping="User[].name"/>
. . .
<action screen="scrUserInfo" param="cbNames.selected"/>
</cScr>

A screen 'scrUserInfo' defines an edit control 'ebName' mapped to a 'name' field of a specific instance of 'User' data component 400 passed as a parameter:

<cScr name="scrUserInfo" param="User">
. . .
<edit name="ebName" mapping="User.name"/>
. . .
</cScr>

Workflow Component Generator Module 120

The workflow component generator module 120 uses the generated dependency links to create component application 105 workflow by creating or otherwise coordinating the creation of scripts for augmenting the XML definitions (i.e. data, message, presentation definitions) of the components 400, 404, 402. The dependency links in script form can represent system/user actions/events such as but not limited to: navigation from one screen to another of the application 105; message generation/interpretation (for both synchronous and asynchronous communication environments) such as for delivering data to the data source 106 in response to user events on the UI 202 and for message interpretation (incoming message to the device 100) for data contents of the message for display to the screen (according to the respective screen component 402) and/or storage to the memory 210; and transfer of data component from one screen to another and/or persistence of the data component in the memory 210. Further, the module 120 generates the workflow components 406 corresponding to the created script commands, such that the workflow components 406 helps to operatively couple the components 400, 402, 404 through formalized workflow when the components 400, 402, 404, 406 are bundled as the application 105 by the component application builder module 122.

The scripts generated by the module 120 can be such as but not limited to using ECMA (European Computer Manufacturers Association) Script, which is a standard script language. The scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the operational facilities of the devices 100 in conjunction with the components 400,402,404,406. In such systems, useful functionality is already available through the user interface 202 (see FIG. 2), and the scripting language is a mechanism for exposing that functionality to application 105 control. In this way, the device 100 is said to provide the host runtime environment 206 of objects and facilities which completes the capabilities of the scripting language.

Specifically, EMCAScript is an object-oriented programming language for performing computations and manipulating computational objects within the host runtime environment 206. ECMAScript can be used as a Web scripting language, providing a mechanism to perform data source 106 computation as part of the Web-based client-server architecture of the system 10 (see FIG. 1). ECMAScript can provide core scripting capabilities for a variety of host runtime environments 206, and therefore the core scripting language can be considered platform neutral for a number of particular host runtime environments 206. The runtime environment 206 (see FIG. 2) can provide the ECMAScript host environment for client-side computation of the devices 100, such as but not limited to; objects that represent windows, menus, pop-ups, dialog boxes, text areas, anchors, frames, history, cookies, and input/output. Further, the host runtime environment 206 provides a means to attach scripting code to events such as but not limited to change of focus, page and image loading, unloading, error, and abort, selection, form submission, and mouse actions. The scripting code appears within the workflow components 406, combines user interface elements and fixed and computed text and images, and is reactive to user interaction on the user interface 202. The data source 106 (see FIG. 1) provides a different host environment for server-side computation including objects representing requests, clients, and files, and mechanisms to lock and share data. By using the client side and server side scripting together, it is possible to distribute computation between the client devices 100 and the data sources 106, while providing a customized user interface 202 for the Web-based component applications 105.

The Script of the workflow components 406 can also define a set of built-in operators which may not be, strictly speaking, functions or methods. Operators include such as but not limited to various unary operations, multiplicative operators, additive operators, bitwise shift operators, relational operators, equality operators, binary bitwise operators, binary logical operators, assignment operators, and the comma operator. ECMAScript syntax resembles Java syntax, however, ECMAScript syntax is relaxed to enable it to serve as an easy-to-use scripting language for developers. For example, a variable in ECMAScript is not required to have its type declared nor are types associated with properties, and defined functions are not required to have their declarations appear textually before calls to them. It is recognized that in a class-based object-oriented programming language, in general, state is carried by instances, methods are carried by classes, and inheritance is only of structure and behavior. In ECMAScript, the state and methods are carried by objects, and structure, behavior, and state are all inherited.

Component Application Builder Module 122

The component application builder module 122 combines all components 400, 402, 404, 406 of the whole component application 105 together, as well as generates mapping information of network 10 communication for use by the Mobile Gateway server 112 that can allow:

direct connection to the data source 106, if available;

or conversion information for interaction between Mobile Gateway 112 and Server of the data source 106 if direct access to data source 106 is not available.

The application 105 packages or bundles generated by the module 122 contain application elements or artifacts such as but not limited to XML definitions and scripts of the components 400, 402, 404, 406, network 10 mappings, application resources, and optionally resource bundle(s) for localization support. XML file definitions are XML coding of application data 400, messages 404, screens 402 components (optionally workflow 406), part of the raw application 105. It is recognised that XML syntax is used only as an example of any structured definition language applicable to coding of the applications 105. The application XML definitions can be represented as a file (e.g. application.def) that is generically named and added to the top level (for example) of a jar application package file.

Application mapping defines the relationship of content in the application messaging to backend operation of the data sources 106, whereby the gateway AG server 112 utilizes this mapping information during communication of the application 105 request/response messages between the runtime environment 206, of the devices 100, and the data sources 106. The mapping information is generated as an annotation to the data source 106 schema. Thus the mapping information and the backend data source 106 interface can be described in a single mapping information file of the package. For example, the data source 106 description can be a WSDL schema of a web-service. Further, there may be multiple such files in the application package file in the case that more than one backend data source 106 is utilized by the application 105. All such mapping files can be grouped together within a mappings folder (not shown) and can be named according to the data source 106 service name. The application file extension can be based on the service type, for example. For example, the artifacts/elements file can have one such application file in the repository 700 for each backend data source 106 service supported by the application 105, e.g. mappings/WeatherService.wsdl and mappings/AirlineBookingSystem.wsdl.

The resources are one or more resources (images, soundbytes, media, etc. . . . ) that are packaged with the application 105 as static dependencies. For example, resources can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles can contain localization information for each language supported by the application 105. These bundles can be located in a locale folder, for example, and can be named according to the language supported (e.g. locale/lang_en.properties and locale/lang_fr.properties).

When the component application 105 is completed, module 122 can publish the application 105 package into the public/corporate Application Repository 700 and/or deploy the application 105 directly to Mobile Gateway server 112.

Tool Computer 14

Figure 5:
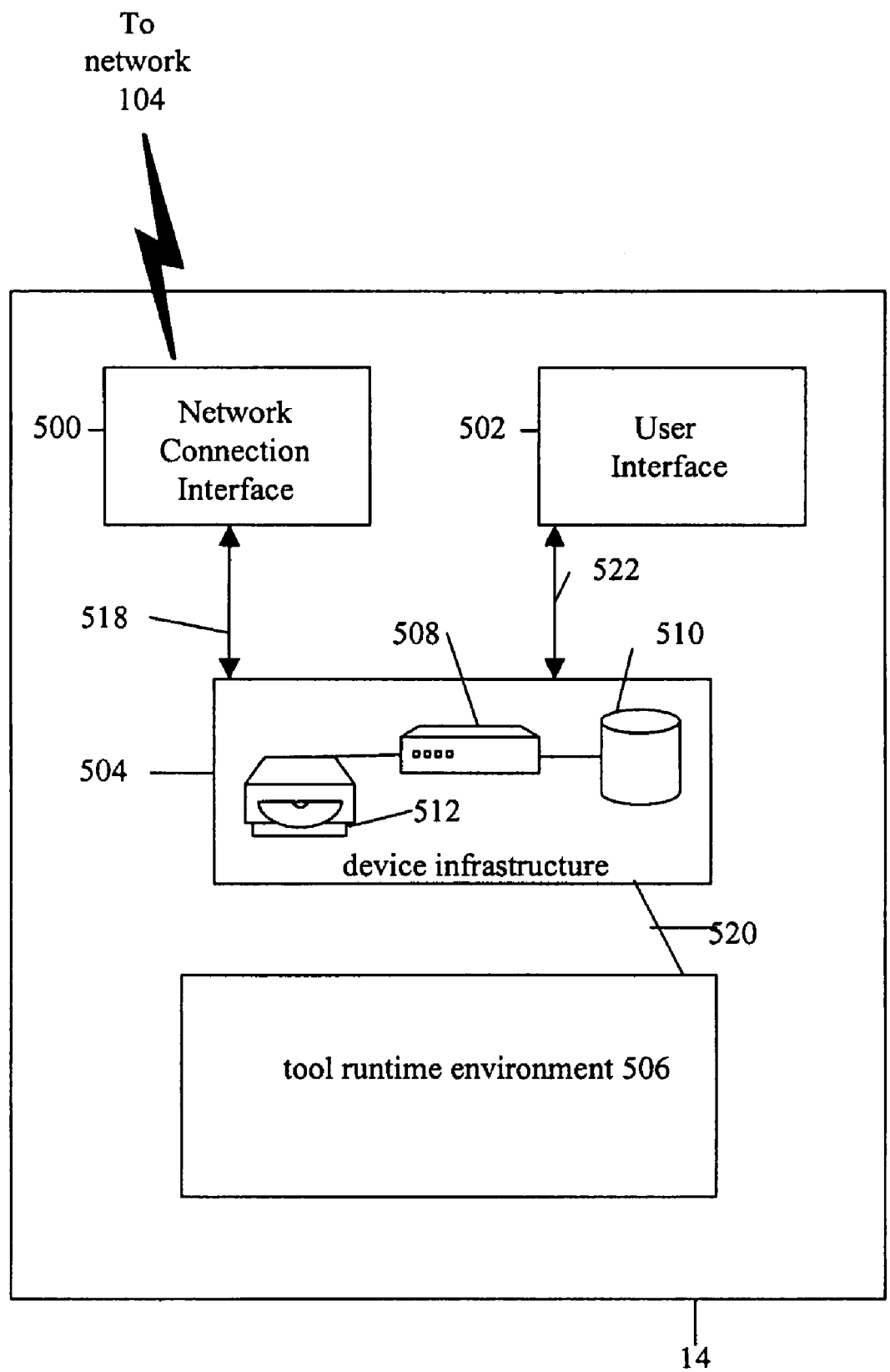
FIG. 5 is a block diagram of a computer for implementing the conversion tools of FIG. 1.

Referring to FIG. 5, the computers 14 include a network connection interface 500, such as a wireless transceiver or a wired network interface card or a modem, coupled via connection 518 to a computer infrastructure 504. The connection interface 500 is connectable during operation of the computer 14 to the network 104, such as to the wireless network 102 by wireless links (e.g., RF, IR, etc.), which enables the computers 14 to communicate with the server 112 and/or the repository 700 (see FIG. 1) for making available the completed component applications 105. The computers 14 also have a user interface 502, coupled to the computer infrastructure 504 by connection 522, to interact with the tool user through the administration module 116. The user interface 502 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the infrastructure 504. The user interface 502 is employed by the user of the computers 14 to generate the component applications 105 from the input applications 107, and then make the completed applications 105 available over the network 104 (see FIG. 1).

Referring again to FIG. 5, operation of the computers 14 is enabled by the infrastructure 504. The infrastructure 504 includes the computer processor 508 and the associated memory module 510. The computer processor 508 manipulates the operation of the network interface 500, the user interface 502 and the runtime environment 506 by executing related instructions, which are provided by an operating system and the tools 12 located in the memory module 510. Further, it is recognized that the infrastructure 504 can include a computer readable storage medium 512 coupled to the processor 508 for providing instructions to the processor and/or to load/update the tools 12 in the memory module 510. The computer readable medium 512 can include hardware and/or software such as, by way of example only, magnetic disks, magnetic tape, optically readable medium such as CD/DVD ROMS, and memory cards. In each case, the computer readable medium 512 may take the form of a small disk, floppy diskette, cassette, hard disk drive, solid state memory card, or RAM provided in the memory module 510. It should be noted that the above listed example computer readable mediums 512 can be used either alone or in combination.

Operation of Conversion Tools 12

Figure 6:
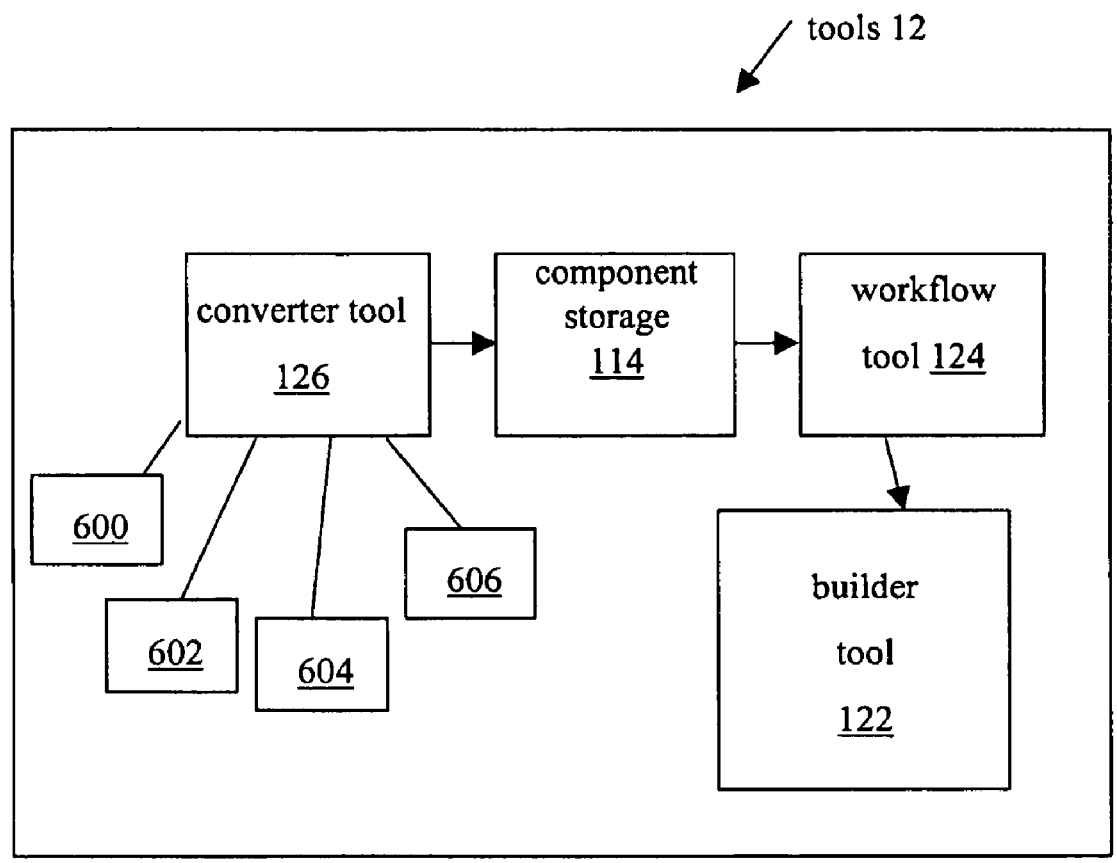
FIG. 6 is an alternative embodiment of the tool of FIG. 1.

Referring to FIG. 6, the conversion tools 12 can be represented as a set or suite of tools 122, 124, 126, as a combined tool 12, or any combination therefore. Interaction with the user of the computer 14 though the user interface 502 can be such that the raw applications 107 are given as input to the tool 126 in order to generate the components 400, 402, 404, 406 for storage in the depot storage 114, or can be such that the generated components 400, 402, 404, 406 are retrieved from storage 114 (in the case where provided by another user and/or designed manually from scratch not using the tool 126) and opimised (optional) and assigned corresponding workflow components using the tool 124. The builder tool 122 would then be used to make the completed applications 105 available to the repository 700 or directly to the server 112.

The tools 12 could function in 3 modes, such as but not limited to:

Initial (learning) phase—only basic mapping patterns applied for conversion, admin user monitors the process and adjusts application 105 generation during conversion. Optionally, the tools 12 could learn from the admin actions and adjust mapping patterns of the module 113 accordingly. After sufficient learning phase (i.e. a number of various web applications 107 converted to component based applications 105) such tools 12 are ready to operate in semi-automated mode;

Semi-automated mode—admin user interaction at page conversion time may no longer be required; admin only applies validation logic at the application building phase of the module 122. Optionally, the tools 12 could learn validation rules to enable fully automated conversion process; and Automated mode—the admin user only interferes if during the application building phase the validation subsystem raises alerts on inconsistency of generated components 400, 402, 404, 406.

Two examples of converting page-based applications 107 to component based applications 105 are as follows.

EXAMPLE 1

Web page fragment (HTML FORM for entry of user info):

```
<FORM action="http://somesite.com/sendUserInfo" method="post">
  <P>
  <LABEL for="firstname">First name: </LABEL>
  <INPUT type="text" id="firstname"><BR>
  <LABEL for="lastname">Last name: </LABEL>
  <INPUT type="text" id="lastname"><BR>
  <LABEL for="email">email: </LABEL>
  <INPUT type="text" id="email"><BR>
  <INPUT type="radio" name="sex" value="Male"> Male<BR>
  <INPUT type="radio" name="sex" value="Female"> Female<BR>
  <INPUT type="submit" value="Send"> <INPUT type="reset">
  </P>
</FORM>
```

HTML Page Converter of the module 113 generates the Screen Component 402, Data Component 400, and Message Component 404 from this form. The components are generated as follows:

```
<screen name="scrUser" type="form" binding="dtUser:UserInfo">
  <layout type="vertical">
  <layout type="flow">
    <label value="First Name:"/>
    <text name="firstname" binding="dtUser.fname"/>
  </layout>
  <layout type="flow">
    <label value="Last Name:"/>
    <text name="lastname" binding="dtUser.lname"/>
  </layout>
  <layout>
    <label value="email:"/>
    <text name="email" binding="dtUser.email"/>
  </layout type="flow">
  <radio_list binding="dtUser.sex>
    <radio name="sex1" value="Male"/>
    <radio name="sex2" value="Female"/>
  <radio_list/>
  <button value="Send" action="sendUserInfo" binding="dtUser"/>
  <layout>
```

```
</screen>
<data name="UserInfo">
    <field name="fname" type="string"/>
    <field name="lname" type="string"/>
    <field name="email" type="string"/>
    <field name="sex" type="string"/>
</data>
<msg name="sendUserInfo" type="out" binding="dtUser:UserInfo/>
```

While seemingly the above example conversion generates more XML text than in the original HTML, one should remember that unlike browser application 107 paradigm in the component based application 105 model the screen definition can be managed by device UI service 308 (see FIG. 3), data components 400 are persisted in the device database storage 210 (see FIG. 2) and the message components 404 are exchanged between the device 100 and the mobile gateway server 112. Such component application 105 model can result in significant savings of bandwidth, low latency, ability to work "out of coverage" and therefore can bring superior user experience.

EXAMPLE 2

Web page fragment (HTML page with TABLEs): The method uses HTML tags <P>, <BR>, <TD>, <TR> at the original web page to format XML screen components 402 accordingly by using combinations of "vertical", "flow", or "grid" layouts:

```
<html>
...
<body>
<h1>Please review your order:</h1>
<p>
<table>
   <tr>
      <td>Items:</td>
      <td>Price:</td>
   </tr>
</table>
<table>
   <tr>
      <td>Microsoft Office 2003 Professional Edition</td>
      <td>$250</td>
   </tr>
   <tr>
      <td>Microsoft Windows XP Professional</td>
      <td>$100</td>
   </tr>
   <tr>
      <td>Logitech Wireless Mouse</td>
      <td>$20</td>
   </tr>
</table>
<table>
   <tr>
      <td>Total:</td>
      <td>$370</td>
   </tr>
</table>
<p> </p>
<table>
   <tr>
<td>Web Store Customer Number:</td>
    <td><INPUT type="text" id="number"></td>
</tr>
<tr>
   <td>Web Store Coupon:</td>
   <td><INPUT type="text" id="coupon"></td>
</tr>
<tr>
   <td>State:</td>
   <td><INPUT type="text" id="state"></td>
</tr>
</table>
<p><a href="UserInfoForm.html">Continue</a></p>
</body>
</html>
```

Step 1: Convert Page

```
<screen name="scrOrder" binding="dtOrder:Order">
   <layout type="vertical">
   <label style="header1" value="Please review your order:"/>
      <layout type="grid">
         <column>
            <label binding="dtOrder.items.name"/>
         </column>
         <column>
            <label binding="dtOrder.items.price"/>
         </column>
      </layout>
      <layout type="flow">
         <label value="Total:"/>
         <label binding="dtOrder.total"/>
      </layout>
      <layout type="grid">
         <column>
            <label value="Web Store Customer Number:"/>
            <label value="Web Store Coupon:"/>
            <label value="State:"/>
         </column>
         <text name="customer" binding="dtOrder.custNum"/>
         <text name="coupon" binding="dtOrder.coupon"/>
         <text name="state" binding="dtOrder.state"/>
      </layout>
      <button value="Continue" screen="scrUser" binding="dtOrder.userInfo"/>
   <layout>
</screen>
<data name="Order">
   <component name="items" type="array:Item"/>
   <component name="userInfo" type="UserInfo"/>
   <field name="custNumber" type="number"/>
   <field name="coupon" type="string"/>
   <field name="state" type="string"/>
</data>
<data name="Item">
   <field name="name" type="string"/>
   <field name="price" type="number"/>
</data>
```

Step 2: Split Page into Subpages if Too Big for Mobile Terminal

```
<screen name="scrOrder1" binding="dtOrder:Order">
    <layout type="vertical">
    <label style="header1" value="Please review your order:"/>
        <layout type="grid">
            <column>
                <label binding="dtOrder.items.name"/>
            </column>
            <column>
                <label binding="dtOrder.items.price"/>
            </column>
        </layout>
        <layout type="flow">
            <label value="Total:"/>
            <label binding="dtOrder.total"/>
        </layout>
        <button value="Next" screen="scrOrder2" binding="dtOrder"/>
    <layout>
</screen>
<screen name="scrOrder2" binding="dtOrder:Order">
    <layout type="vertical">
    <layout type="grid">
        <column>
            <label value="Web Store Customer Number:"/>
            <label value="Web Store Coupon:"/>
            <label value="State:"/>
        </column>
        <text name="customer" binding="dtOrder.custNum"/>
        <text name="coupon" binding="dtOrder.coupon"/>
        <text name="state" binding="dtOrder.state"/>
    </layout>
    <button value="Continue" screen="scrUser" binding="dtOrder.userInfo"/>
    <layout>
</screen>
```

Using the presentation pages from Example 1 and Example 2, the tools 12 produce linked XML components 400,402,404 with the following workflow components 406:

a) screens "scrOrder1" and "scrOrder2" are linked through the action button "Next": data component "Order" is passed from one screen to another during screen navigation;

b) screens "scrOrder2" and "scrUser" are linked through the action button "Continue": data component "UserInfo" (nested in "Order") is passed from one screen to another during screen navigation; and c) screen "scrUser" and message "sendUserInfo" are linked through the action button "Send": the message "sendUserInfo" carries "UserInfo" data component to the server.

Figure 7:
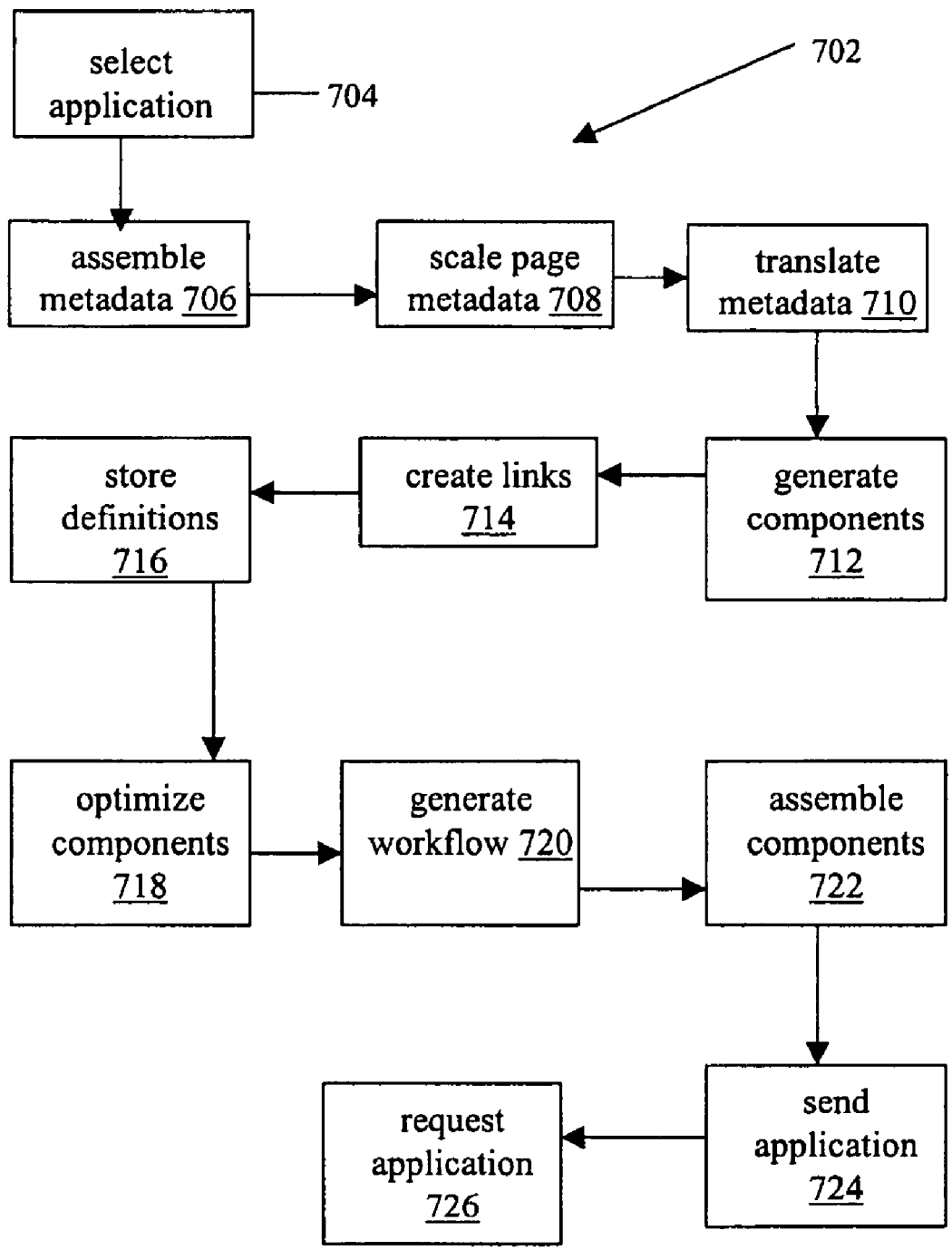
FIG. 7 is an example operation of the tools of FIG. 1.

Referring to FIG. 7, operation 702 of the tools 12, 124, 126, 122 is given, recognizing that operation of one tool can begin where another has finished in the process of converting the input page-based application 107 to the component based application 105. At step 704, the application 107 is selected for conversion. At step 706 the page metadata is assembled or other wise created for each presentation page of the application 107. At step 708 the page metadata is scaled, if necessary, to be compatible with the display capabilities of the UI 202 of the device 100 (see FIG. 2). At step 710 the page metadata is converted into the selected structured definition language according to the respective translation algorithm of the module 113. At step 712 the definitions of the translated metadata are organized into respective data 400, message 404 and appropriate presentation 402 components. It is recognized that generation of the presentation components 402 can be done manually by the user of the computer 14, i.e. separate from the conversion process implemented by the conversion'tools 12. At step 714 the inherent dependency links of the page-based application 107, and/or customized dependency links created by the user (e.g. subpage navigation) are generated from the page metadata. It is recognized that generation of the dependency links can be done combined with step 712, before step 712, or a combination thereof. At step 716, the completed components 400, 402, 404 and dependency link definitions are stored in the storage module 114. At step 718 the components 400,402,404 are analysed for optimization (e.g. duplication of components and generation of mappings). At step 720 the dependency links are processed by the module 120 and corresponding selected script language or other command language is used to represent the links as a series of instructions in workflow components 406. At step 722 the module 122 assembles the components 400,402,404,406 and any other suitable application elements/artifacts (as described above) into the component application 105 package, suitable for sending 724 to the repository and/or the server 112. Accordingly, the device 100 at step 726 requests the application package 105 from the server 112 for enabling communication with a selected data source 106.

It is recognized that component applications 105 which are created using the methods described above can require less time to create than hard coded applications, since the component applications 105 do not use full programming languages, but rather use standards-based technologies such as XML and ECMAScript, which are comparatively simple and easy to learn. The methods can result in component applications 105 in which the user-interface 202 and the definition of the data are decoupled. This decoupling allows for modification of any component 400, 402, 404, 406 in the component application 105 without affecting and requiring substantial changes to other components 400, 402, 404, 406 in the application 105, and thus can facilitate maintenance of the component applications 105, including modification and updating of the component applications 105 on the device 100.

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define component applications 105. It is recognised that the structured definition languages of the application 107 metadata and the application 105 metadata can be the same or different, as desired.

The embodiments of the invention in which an exclusive property or privilege is claimed are defined as the follows:

1. A method for representing a workflow for a plurality of components transformed from a pre-existing page-based application, the plurality of components for configuring as a component based application to assist with messaging over a network between a device and a schema-defined service of a data source, the page-based application configured as a series of presentation pages including embedded data, messaging and presentation elements for interaction with a user interface, the method comprising the steps of:

selecting the plurality of components transformed from the page-based application, the plurality of components comprising a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language;

selecting a plurality of dependency links associated with events corresponding to the embedded elements, the dependency links for describing the workflow of the plurality of components in respect to operation of the component based application when executed on the device;

generating in an instructional language a set of instructions based on the dependency links, the set of instructions for coordinating the operation of the plurality of components; and inserting the set of instructions in a workflow component; wherein the plurality of components and the workflow component are subsequently packaged as the component based application.

2. The method of claim 1, wherein the events are selected from the group comprising user events and system events.

3. The method of claim 2, wherein the events are selected from the group comprising screen navigation between screens of the component based application, data persistence on the device, incoming and outgoing messages with respect to the device, and data transfer between screens of the component based application.

4. The method of claim 3, wherein the messages are selected from the group comprising synchronous messages and asynchronous messages.

5. The method of claim 4, wherein the additional dependency link is associated with a user navigation event between the sub-pages.

6. The method of claim 2 further comprising the step of selecting a dependency link in addition to the plurality of dependency links associated with the events corresponding to the embedded elements, the additional dependency link accounting for interaction of sub-pages of the component based application, the sub-pages representing the splitting of a page of the page-based application according to presentation capabilities of the device.

7. The method of claim 2, wherein the events define interaction between the component based application and non-component based device functionality.

8. The method of claim 2 further comprising the step of optimizing the plurality of components.

9. The method of claim 8, wherein the optimization modifies the content of the plurality of the dependency links.

10. The method of claim 8, wherein the step of optimizing includes validation for component duplication.

11. The method of claim 8, wherein the step of optimizing further includes component modification selected from the group comprising: incorporating direct screen transfer links; configuring mappings between selected pairings of the presentation and data components; and configuring mappings between selected pairings of the message and data components.

12. The method of claim 11, wherein the mappings represent a stated relationship between definitions in the pairs of the components.

13. The method of claim 2, wherein the structured definition language is XML.

14. The method of claim 2, wherein the instructional language is Java Script.

15. The method of claim 14, wherein the set of instructions includes built in operators.

16. The method of claim 2, wherein the embedded elements are selected from the group comprising: HTML; JSP; and ASP page-based applications.

17. The method of claim 2, wherein the plurality of dependency links are obtained from a document containing the dependency links, the document contents are described in the structured definition language.

18. The method of claim 1, wherein the data component descriptors represent the data element associated with presentation content of the page-based application.

19. The method of claim 1, wherein the message component descriptors represent the message element associated communication between the device and the data source.

20. The method of claim 1, wherein the presentation component descriptors represent the presentation element associated with presentation content of the page-based application.

21. A system for representing a workflow for a plurality of components transformed from a pre-existing page-based application, the plurality of components for configuring as a component based application to assist with messaging over a network between a device and a schema-defined service of a data source, the page-based application configured as a series of presentation pages including embedded data, messaging and presentation elements for interaction with a user interface, the system comprising:

a processor and a memory coupled thereto, said memory storing computer readable code for configuring the processor for execution, said code comprising:

a component storage module for providing the plurality of components transformed from the page-based application, the plurality of components comprising a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language, and for providing a plurality of dependency links associated with events corresponding to the embedded elements, the dependency links for describing the workflow of the plurality of components in respect to operation of the component based application when executed on the device; and a workflow module generating in an instructional language a set of instructions based on the dependency links, the set of instructions for coordinating the operation of the plurality of components and for inserting the set of instructions in a workflow component;

wherein the plurality of components and the workflow component are subsequently packaged as the component based application.

22. The system of claim 21, wherein the events are selected from the group comprising user events and system events.

23. The system of claim 22, wherein the events are selected from the group comprising screen navigation between screens of the component based application, data persistence on the device, incoming and outgoing messages with respect to the device, and data transfer between screens of the component based application.

24. The system of claim 23, wherein the messages are selected from the group comprising synchronous messages and asynchronous messages.

25. The system of claim 24, wherein the additional dependency link is associated with a user navigation event between the sub-pages.

26. The system of claim 22 further comprising a dependency link in addition to the plurality of dependency links associated with the events corresponding to the embedded elements, the additional dependency link accounting for interaction of sub-pages of the component based application, the sub-pages representing the splitting of a page of the page-based application according to presentation capabilities of the device.

27. The system of claim 22, wherein the events define interaction between the component based application and non-component based device functionality.

28. The system of claim 22 wherein the code further comprising a component analyzer module for optimizing the plurality of components.

29. The system of claim 28, wherein the component analyzer module modifies the content of the plurality of the dependency links.

30. The system of claim 28, wherein the component analyzer module validates for component duplication.

31. The system of claim 28, wherein the component analyzer module further performs component modification selected from the group comprising: incorporating direct screen transfer links; configuring mappings between selected pairings of the presentation and data components; and configuring mappings between selected pairings of the message and data components.

32. The system of claim 31, wherein the mappings represent a stated relationship between definitions in the pairs of the components.

33. The system of claim 22, wherein the structured definition language is XML.

34. The system of claim 22, wherein the instructional language is Java Script.

35. The system of claim 34, wherein the set of instructions includes built in operators.

36. The system of claim 22, wherein the embedded elements are selected from the group comprising: HTML; JSP; and ASP page-based applications.

37. The system of claim 22, wherein the plurality of dependency links are obtained from a document containing the dependency links, the document contents are described in the structured definition language.

38. The system of claim 22, wherein the data component descriptors represent the data element associated with presentation content of the page-based application.

39. The system of claim 22, wherein the message component descriptors represent the message element associated communication between the device and the data source.

40. The system of claim 22, wherein the presentation component descriptors represent the presentation element associated with presentation content of the page-based application.

41. A computer program product for representing a workflow for a plurality of components transformed from a pre-existing page-based application, the plurality of components for configuring as a component based application to assist with messaging over a network between a device and a schema-defined service of a data source, the page-based application configured as a series of presentation pages including embedded data, messaging and presentation elements for interaction with a user interface, the computer program product comprising:
 a computer readable medium;
 a component storage module stored on the computer readable medium for providing the plurality of components transformed from the page-based application, the plurality of components comprising a data component having data descriptors representing the data elements and a message component having message descriptors representing the message elements and a presentation component having presentation descriptors representing the presentation elements, at least two of the plurality of components being operatively coupled to one another, the descriptors expressed in a structured definition language, and for providing a plurality of dependency links associated with events corresponding to the embedded elements, the dependency links for describing the workflow of the plurality of components in respect to operation of the component based application when executed on the device; and
 a workflow module coupled to the storage module for generating in an instructional language a set of instructions based on the dependency links, the set of instructions for coordinating the operation of the plurality of components and for inserting the set of instructions in a workflow component;
 wherein the plurality of components and the workflow component are subsequently packaged as the component based application.

* * * * *